United States Patent
Hwang et al.

(10) Patent No.: US 12,130,984 B2
(45) Date of Patent: Oct. 29, 2024

(54) DISPLAY DEVICE HAVING TOUCH SENSOR AND DRIVING METHOD OF THE SAME

(71) Applicant: LG DISPLAY CO., LTD., Seoul (KR)

(72) Inventors: Jong Hee Hwang, Paju-si (KR); Bo Gun Seo, Paju-si (KR); Kyoung Hwan Kim, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/897,482

(22) Filed: Aug. 29, 2022

(65) Prior Publication Data

US 2023/0176684 A1 Jun. 8, 2023

(30) Foreign Application Priority Data

Dec. 7, 2021 (KR) .................. 10-2021-0173501

(51) Int. Cl.
*G06F 3/041* (2006.01)
*G06F 3/044* (2006.01)

(52) U.S. Cl.
CPC ...... *G06F 3/04166* (2019.05); *G06F 3/04164* (2019.05); *G06F 3/0443* (2019.05); *G06F 2203/04112* (2013.01)

(58) Field of Classification Search
CPC ............. G06F 3/04166; G06F 3/04164; G06F 3/0443; G06F 2203/04112; G06F 3/041; G06F 3/0412; G06F 3/044; G06F 3/0445; G06F 3/0446
See application file for complete search history.

(56) References Cited

U.S. PATENT DOCUMENTS

| | | | |
|---|---|---|---|
| 10,573,236 B1* | 2/2020 | Gao | G09G 3/2044 |
| 11,626,466 B2* | 4/2023 | Bok | H10K 59/88 257/71 |
| 2014/0359756 A1* | 12/2014 | Alameh | G06F 3/041661 726/19 |
| 2015/0177884 A1* | 6/2015 | Han | G06F 3/04166 345/174 |
| 2016/0147375 A1* | 5/2016 | Bok | G06F 3/0421 345/175 |
| 2017/0220182 A1* | 8/2017 | Schwartz | G06F 3/0412 |
| 2020/0327297 A1* | 10/2020 | An | G06F 3/0412 |
| 2020/0343325 A1* | 10/2020 | Cai | G06F 3/0412 |
| 2021/0191548 A1* | 6/2021 | Huang | G06F 3/0412 |
| 2021/0193746 A1* | 6/2021 | Lee | H01L 27/156 |

(Continued)

*Primary Examiner* — Bryan Earles
(74) *Attorney, Agent, or Firm* — POLSINELLI PC

(57) ABSTRACT

A display device includes a pixel unit including a sensing region where pixels are disposed at a first pixels per inch (PPI) and a display region where pixels are disposed at a second PPI; a touch sensor unit disposed on the pixel unit, and including a first touch sensor region where touch sensors are disposed at a first electrode density and a second touch sensor region where touch sensors are disposed at a second electrode density higher than the first electrode density; a display panel driver configured to drive the pixel unit; and a touch sensor driver configured to change at least one of a voltage level of a driving pulse applied to the first touch sensor region and an accumulated number of the touch signals sensed from the first touch sensor region based on the touch signals sensed from the first touch sensor region overlapping with the sensing region.

20 Claims, 21 Drawing Sheets

(56) References Cited

U.S. PATENT DOCUMENTS

2022/0057898 A1* 2/2022 Lee .................. H10K 59/40
2022/0197416 A1* 6/2022 Lim .................. G09G 3/3685
2023/0333684 A1* 10/2023 Huang ................ G06F 3/0412

* cited by examiner

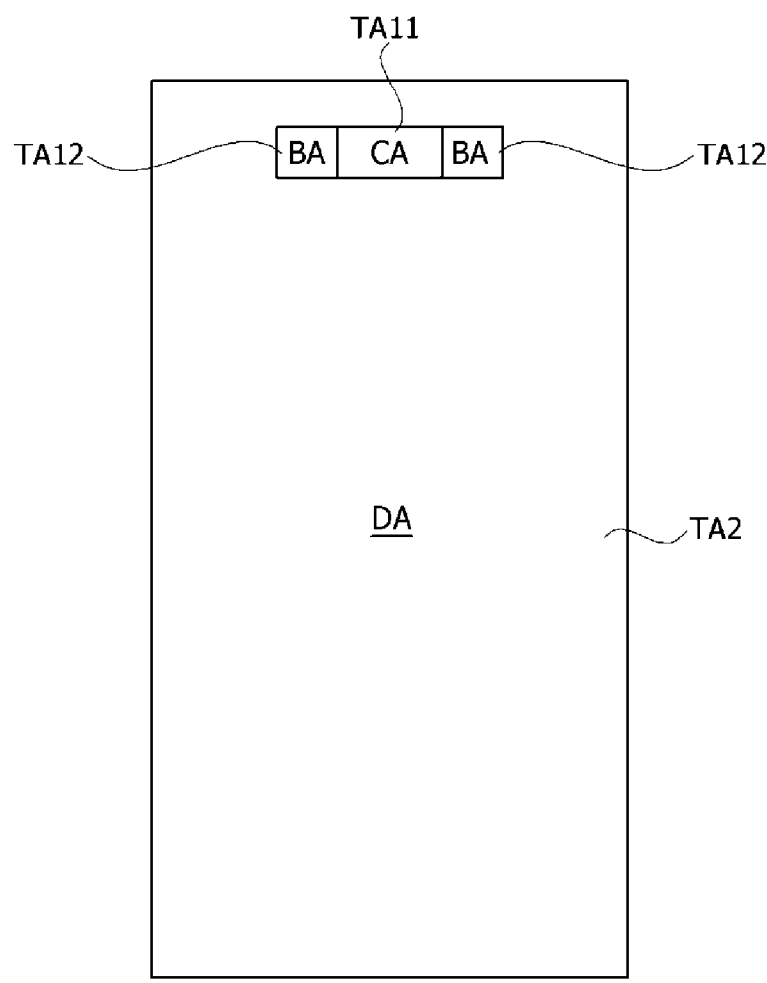

Charging

EQUIVALENT CIRCUIT

FIRST TOUCH SENSOR REGION

SECOND TOUCH SENSOR REGION

DISPLAY DEVICE HAVING TOUCH SENSOR AND DRIVING METHOD OF THE SAME

CROSS-REFERENCE TO RELATED APPLICATION

This application claims the priority of Korean Patent Application No. 10-2021-0173501, filed on Dec. 7, 2021, which is hereby incorporated by reference in its entirety.

BACKGROUND

Field of the Disclosure

The present disclosure relates to a display device having a touch sensor and a driving method of the same.

Description of the Background

A user interface (UI) enables communication between a person (user) and various electronic devices, and thus the user can easily and freely control a device. User interface technology is developing in a direction of increasing user sensibility and operation convenience, and recently, has been developed into a touch UI, a voice recognition UI, a three-dimensional UI, and the like.

The touch UI senses a touch input by implementing a touch screen on a display panel and transmits a user input to the electronic device. The touch UI is essential for a portable information device such as a smart phone, and has been applied to notebook computers, computer monitors, home appliances, and the like.

In addition to implementing this touch screen, a technical approach is being made to dispose sensors each including a camera under a display panel to implement a full screen display. Even when the camera is disposed under the display panel, it is necessary to apply a touch technology.

However, since an electrode density of the touch sensors disposed on a front surface of the screen is identically applied, light scattering and transmittance reduction by the touch sensors can occur. Since the electrode density of touch sensors affects touch sensitivity, it is difficult to secure accurate touch performance when the electrode density of touch sensors is changed.

SUMMARY

Accordingly, the present disclosure is directed to solving all the above-described necessity and problems.

The present disclosure is directed to providing a display device having a touch sensor and a driving method that can provide accurate touch performance to minimize light scattering and transmittance reduction even when the electrode density of the touch sensors is changed.

The present disclosure is not limited to the above-described and other features of the present disclosure will be apparent to those skilled in the art from the following descriptions.

In an aspect of the present disclosure, a display device includes: a pixel unit including a sensing region where pixels are disposed at a first pixels per inch (PPI) and a display region where pixels are disposed at a second PPI higher than the first PPI; a touch sensor unit disposed on the pixel unit, and including a first touch sensor region where touch sensors are disposed at a first electrode density and a second touch sensor region where touch sensors are disposed at a second electrode density higher than the first electrode density; a display panel driver configured to drive the pixel unit; and a touch sensor driver configured to change at least one of a voltage level of a driving pulse applied to the first touch sensor region and an accumulated number of the touch signals sensed from the first touch sensor region based on the touch signals sensed from the first touch sensor region overlapping with the sensing region.

In the present disclosure, accurate touch performance can be secured by changing at least one of a voltage level of a driving pulse applied to a touch sensor region and an accumulated number of touch signals sensed from the touch sensor region based on the touch signals sensed from the touch sensor region overlapping with a sensing region even when an electrode density of the touch sensors is changed. That is, the optical characteristics for an optical sensor according to a touch density change in the sensing region can be secured.

The present disclosure is not limited to the above-mentioned effects, and other effects that are not mentioned will be apparently understood by those skilled in the art from the following description and the appended claims.

BRIEF DESCRIPTION OF THE DRAWINGS

The above and other features and advantages of the present disclosure will become more apparent to those of ordinary skill in the art by describing in detail exemplary aspects thereof with reference to the accompanying drawings, in which:

FIGS. 7A to 7D are views illustrating a touch sensor electrode density in a touch sensor region according to the present disclosure;

DETAILED DESCRIPTION OF EXEMPLARY ASPECTS

Figure 1:
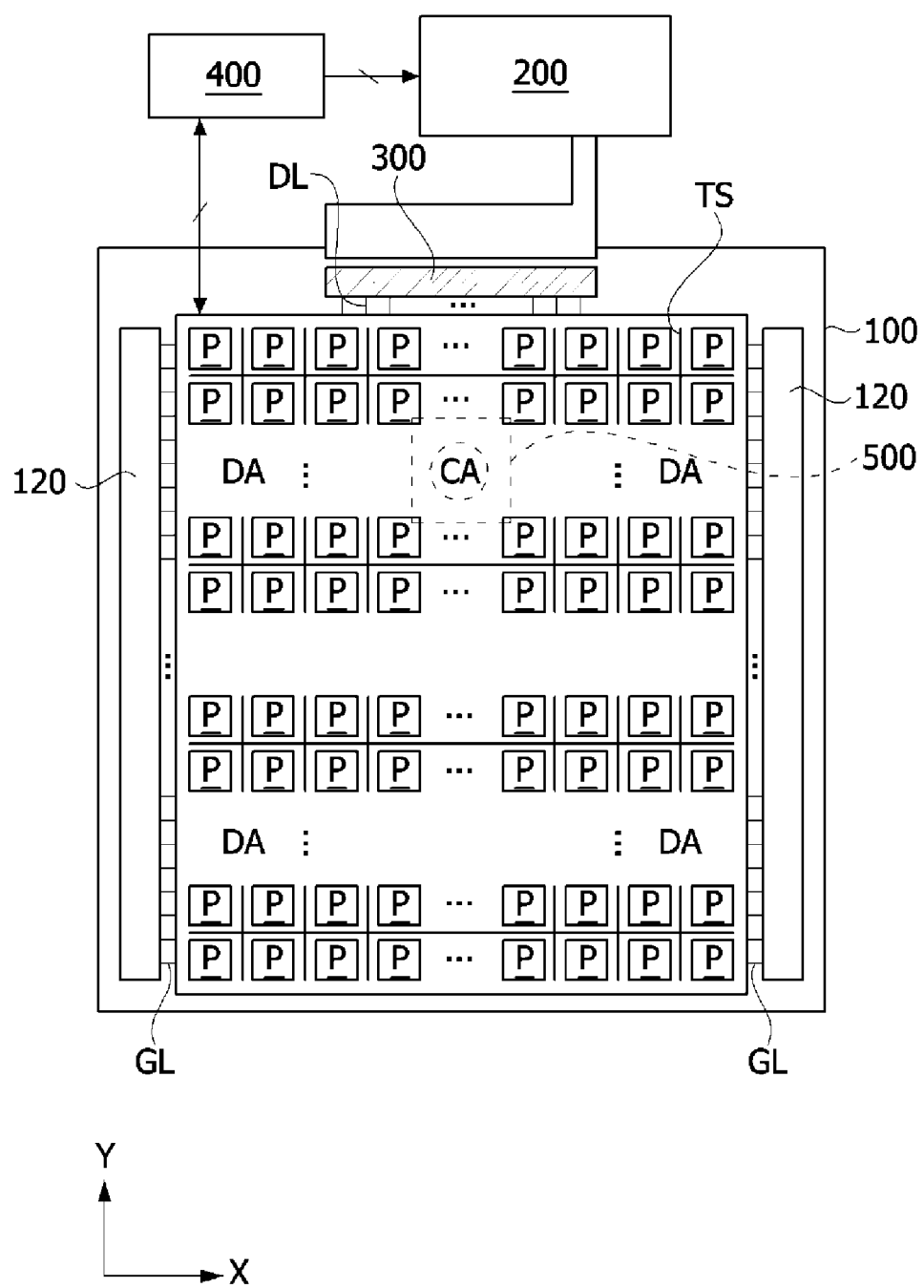
FIG. 1 is a view schematically illustrating a display device according to the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following aspects can be partially or entirely bonded to or combined with each other and can be linked and operated in technically various ways. The aspects can be carried out independently of or in association with each other.

Hereinafter, various aspects of the present disclosure will be described in detail with reference to the accompanying drawings.

A display device of the present disclosure may be implemented as a flat panel display device such as a liquid crystal display (LCD) device, an organic light emitting diode display (OLED display) device, or the like. In the aspects to be described below, an organic light emitting diode display device will be mainly described as an example of a flat panel display device, but the present disclosure is not limited thereto.

Touch sensors of the present disclosure may be disposed on a screen of a display panel in an on-cell type or an add-on type, or an in-cell type touch sensor may be built-in in the display panel. In the aspects to be described below, the in-cell type touch sensor will be mainly described, but the touch sensors of the present disclosure are not limited thereto.

Figure 2:
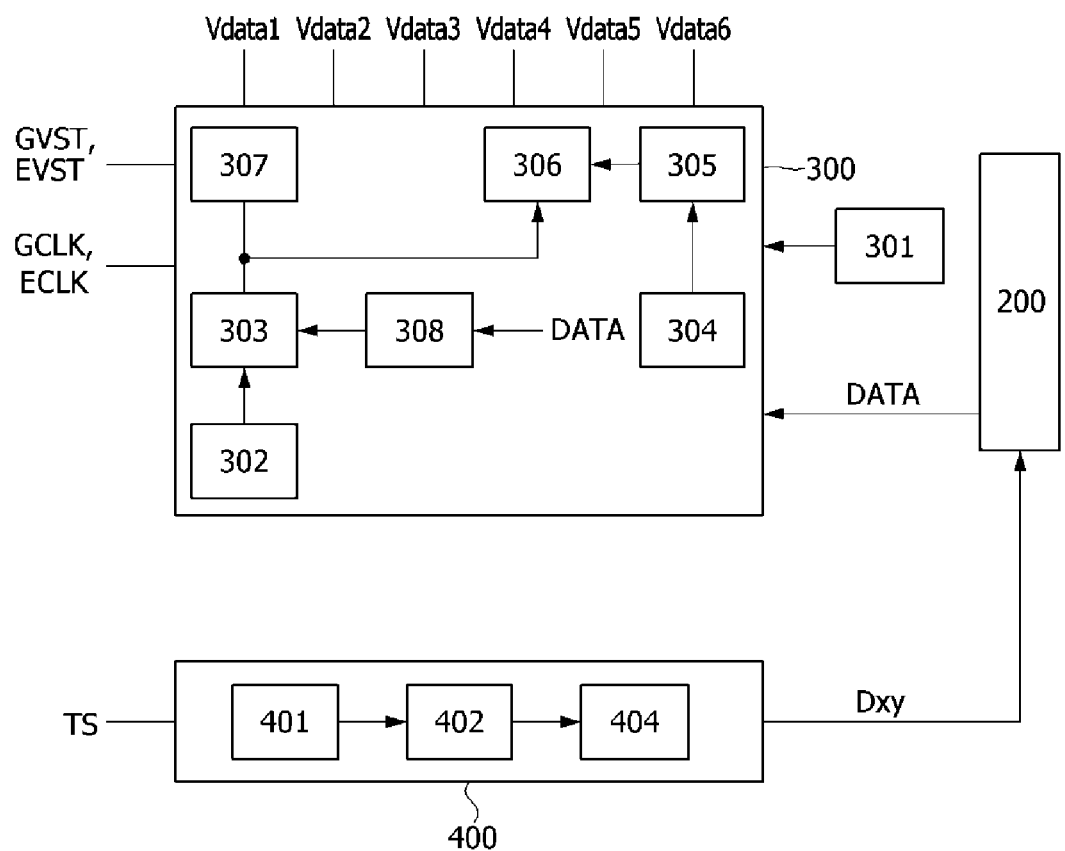
FIG. 2 is a view schematically illustrating a configuration of a drive IC.

FIG. 1 is a view schematically illustrating a display device according to the present disclosure, and FIG. 2 is a view schematically illustrating a configuration of a drive IC.

Referring to FIGS. 1 and 2, the display device according to the aspect of the present disclosure may include a display panel 100 in which a pixel array is disposed on a screen, a display panel driver, a touch sensor driver 400, and the like.

The pixel array of the display panel 100 includes a plurality of data lines DL, a plurality of gate lines GL crossing the plurality of data lines DL, and display pixels P arranged in a matrix form defined by the data lines DL and the gate lines GL. The pixel array may further include power lines for supplying power to pixels. The pixel array includes display regions DA which display an input image in a display mode and sensing regions CA.

Light proceeding through the sensing regions CA is incident on light reception surfaces of optical sensor unit 500 disposed under the display panel 100.

In the display regions DA and the sensing regions CA, each sub-pixel of the display pixel includes a pixel circuit. The pixel circuit includes a driving element which supplies a current to a light emitting element (OLED), a plurality of switch elements which sample a threshold voltage of the driving element and switch a current path of the pixel circuit, a capacitor which maintains a gate voltage of the driving element, and the like. Each sensor pixel S of the sensing regions CA includes an organic photodiode and a sensor driving circuit which drives the photodiode.

The display panel driver writes pixel data of the input image to the display pixels P. The display panel driver includes a data driver 306 which supplies a data voltage of the pixel data to the data lines DL, and a gate driver 120 which supplies a gate pulse sequentially to the gate lines GL. The data driver 306 may be integrated into a drive IC 300. The data driver 306 may be integrated into the drive IC 300 together with a timing controller 303.

The drive IC 300 may include a data reception and calculation unit 308, the timing controller 303, the data driver 306, a gamma compensation voltage generator 305, a power supply unit 304, a second memory 302, and the like. The drive IC 300 may be connected to a host system 200, a first memory 301, and the display panel 100.

The drive IC 300 may be adhered onto the display panel 100. The drive IC 300 receives the pixel data of the input image and a timing signal from the host system 200 to supply the data voltage of the pixel data to the display pixels through the data lines DL, and synchronize the data driver 306 and the gate driver 120.

The drive IC 300 is connected to the data lines DL through data output channels to supply the data voltage of the pixel data to the data lines DL. The drive IC 300 may output a gate timing signal for controlling the gate driver 120 through gate timing signal output channels. The gate timing signal generated from the timing controller 303 may include a start pulse (or gate start pulse) VST, a shift clock (or gate shift clock) CLK, and the like. The start pulse VST and the shift clock CLK swing between a gate-on voltage VGL and a gate-off voltage VGH. The gate timing signals VST and CLK output from a level shifter 307 are applied to the gate driver 120 to control a shift operation of the gate driver 120.

The gate driver 120 may include a shift register formed in a circuit layer of the display panel 100 together with the pixel array. The shift register of the gate driver 120 supplies a gate signal sequentially to the gate lines GL under control of the timing controller 303. The gate signals include a scan pulse applied to the pixel circuit, a pulse of an emission control signal (hereinafter, referred to as an "EM pulse"), and an exposure signal TG applied to the sensor driving circuit. The shift register may include a scan driver which outputs the scan pulse and an EM driver which outputs the EM pulse. In FIG. 2, GVST and GCLK are gate timing signals input to the scan driver. EVST and ECLK are gate timing signals input to the EM driver.

The data reception and calculation unit 308 includes a reception unit which receives the pixel data input as a digital signal from the host system 200, and a data calculation unit which improves image quality by processing the pixel data input through the reception unit. The data calculation unit may include a data restoration unit which decodes and restores compressed pixel data, an optical compensation unit which adds a preset optical compensation value to the pixel data, and the like. The optical compensation value may be derived for each pixel and stored in the memories 301 and 302 in a look-up table form to compensate for a luminance deviation of pixels, which is measured based on an image captured and obtained by the camera in a manufacturing process.

An external compensation circuit may be applied to the display pixels and the drive IC. In this case, the data reception and calculation unit 308 may compensate for driving deviation and deterioration of the pixels by adding or multiplying a sensing result of the display pixels to the pixel data of the input image.

The timing controller 303 provides the pixel data of the input image received from the host system 200 to the data driver 306. The timing controller 303 generates the gate timing signal for controlling the gate driver 120 and a source timing signal for controlling the data driver 306 to control operation timings of the gate driver 120 and the data driver 306.

The data driver 306 converts the pixel data (or digital data) received from the timing controller 303 through a digital to analog converter (DAC) to a gamma compensation voltage and outputs the data voltage. The data voltage output from the data driver 306 is supplied to the data lines DL of the pixel array through an output buffer connected to a data channel of the drive IC 300.

The gamma compensation voltage generator 305 divides a gamma reference voltage from the power supply unit 304 through a voltage dividing circuit to generate the gamma compensation voltage for each gray level. The gamma compensation voltage is an analog voltage in which a voltage is set for each gray level of pixel data. The gamma compensation voltage output from the gamma compensation voltage generator 305 is provided to the data driver 306. The gamma compensation voltage generator 305 may be implemented as a programmable voltage generation circuit capable of varying a voltage level of an output voltage according to a register setting value.

The power supply unit 304 generates power required for driving the pixel array of the display panel 100, the gate driver 120, and the drive IC 300 using a DC-DC converter. The DC-DC converter may include a charge pump, a regulator, a buck converter, a boost converter, and the like. The power supply unit 304 may adjust a DC input voltage from the host system 200 to generate DC power such as the gamma reference voltage, the gate-on voltage VGL, the gate-off voltage VGH, a pixel driving voltage ELVDD, a low potential power voltage ELVSS, a reference voltage Vref, an initialization voltage Vini, and the like. The gamma reference voltage is supplied to the gamma compensation voltage generator 305. The gate-on voltage VGL and the gate-off voltage VGH are supplied to the level shifter 307 and the gate driver 120. Pixel power, such as the pixel driving voltage ELVDD, the low potential power voltage ELVSS, the initialization voltage Vini, and the like, is commonly supplied to the pixels P. The pixel driving voltage ELVDD is set to a voltage higher than the low potential power voltage ELVSS. The initialization voltage Vini and the reference voltage Vref may be set to voltages lower than the pixel driving voltage ELVDD and lower than or equal to the low potential power voltage ELVSS.

The second memory 302 stores a compensation value, register setting data, and the like received from the first memory 301 when power is input to the drive IC D-IC. The compensation value may be applied to various algorithms to improve image quality. The compensation value may include an optical compensation value. The register setting data is previously set to control operations of the data driver 306, the timing controller 303, the gamma compensation voltage generator 305, and the like. The first memory 301 may include a flash memory. The second memory 302 may include a static random-access memory (SRAM).

The host system 200 may be implemented as an application processor (AP). The host system 200 may transmit the pixel data of the input image to the drive IC 300 through a mobile industry processor interface (MIPI). The host system 200 may be connected to the drive IC 300 through a flexible printed circuit, for example, a flexible printed circuit (FPC).

A touch sensor TS may be implemented as a capacitive type touch sensor, for example, a mutual capacitance sensor or a self-capacitance sensor. Self-capacitance is formed along a single-layer conductor line formed in one direction. Mutual capacitance is formed between two orthogonal conductor lines. The touch sensor TS may be implemented as a mesh type line to increase light transmittance.

The mutual capacitance sensor includes the mutual capacitance formed between two touch electrodes. A mutual capacitance sensing circuit applies a driving signal or a stimulation signal to any one of the two electrodes, and senses a touch input based on a charge change amount of the mutual capacitance through another electrode. When a conductor approaches the mutual capacitance, since a charge amount of the mutual capacitance is reduced, the touch input or gesture may be sensed.

The self-capacitance sensor includes a self-capacitance formed in each sensor electrode. A self-capacitance sensing circuit supplies electric charges to each sensor electrode and senses a touch input based on a charge change amount of the self-capacitance. When the conductor approaches the self-capacitance, since the capacitance due to the conductor is connected to the capacitance of the sensor in parallel, a capacitance value increases. Accordingly, in the case of self-capacitance, the capacitance value of the sensor increases when the touch input is sensed.

The touch sensor driver 400 applies the driving signal to the touch sensor TS, and senses a change in capacitance of the touch sensor TS to output the touch data when the change in capacitance is greater than or equal to a preset threshold value. The touch data includes coordinate information of each touch input. The touch data is transmitted to the host system 200. The host system 200 executes a command or an application program corresponding to the touch input.

The touch sensor driver 400 includes a sensing unit 402 and a touch recognition unit 404. The sensing unit 402 includes a driver which applies a sensor driving signal to the touch sensor TS, an amplifier which amplifies the signal of the touch sensor TS, an integrator which accumulates an output voltage of the amplifier, an ADC which converts a voltage of the integrator to digital data, and the like. The digital data output from the ADC indicates the change in capacitance of the touch sensor TS before and after the touch input. The touch recognition unit 404 compares the touch data received from the sensing unit with a preset threshold value, and detects the touch data higher than the threshold value to generate coordinates Dxy of each touch input. The touch recognition unit 404 transmits the touch data Dxy which indicates a position of each touch input to the host system 200. The touch sensor driver 400 may be implemented as a micro control unit (MCU), but is not limited thereto. The touch sensor driver 400 may be built-in in the drive IC 300 in a mobile device or a wearable device.

The display panel 100 may be implemented as a flexible panel applicable to a flexible display. The flexible display may be changed in screen size by rolling, folding, and bending the flexible panel, and may be easily manufactured in various designs. The flexible display may be implemented as a rollable display, a foldable display, a bendable display, a slidable display, or the like. The flexible panel may be manufactured as a so-called "plastic OLED panel". The plastic OLED panel may include a back plate, and a pixel array disposed on an organic thin film adhered to the back plate.

The back plate may be a polyethylene terephthalate (PET) substrate. The pixel array and the touch sensor array may be formed on an organic thin film substrate. The back plate may block moisture permeation toward the organic thin film so that the pixel array is not exposed to moisture. The organic thin film substrate may be a polyimide (PI) substrate. A multi-layer buffer film formed of an insulating material (not shown) may be formed on the organic thin film substrate. A circuit layer and a light emitting element and sensor layer may be stacked on the organic thin film.

The circuit layer may include a pixel circuit connected to lines such as data lines, gate lines, and power lines, and the like, a gate driver (GIP) connected to the gate lines, a demultiplexer array omitted from the drawing, a circuit for an auto probe check, and the like. The lines and circuit elements of the circuit layer may include a plurality of insulating layers, two or more metal layers separated from each other with the insulating layer therebetween, and an active layer including a semiconductor material. All transistors formed in the circuit layer may be implemented as oxide thin film transistors (TFTs) each including an n-channel type oxide semiconductor.

The transistor is a three-electrode element including a gate, a source, and a drain. The source is an electrode which supplies carriers to the transistor. In the transistor, the carriers start flowing from the source. The drain is an electrode through which the carriers exit the transistor. In the transistor, the carriers flow from the source to the drain. In the case of an n-channel transistor, since the carriers are electrons, a source voltage has a voltage lower than a drain voltage so that the electrons may flow from the source to the drain. In the n-channel transistor, current flows in a direction from the drain to the source. In the case of a p-channel transistor (PMOS), since the carriers are holes, a source voltage is higher than a drain voltage so that the holes may flow from the source to the drain. In the p-channel transistor, since the holes flow from the source to the drain, current flows from the source to the drain. It should be noted that the source and drain of the transistor are not fixed. For example, the source and the drain may be changed according to a voltage to be applied. Accordingly, the present disclosure is not limited due to the source and drain of the transistor. In the description below, the source and drain of the transistor will be referred to as first and second electrodes.

The gate pulse swings between a gate-on voltage and a gate-off voltage. The gate-on voltage is set to a voltage higher than a threshold voltage of the transistor, and the gate-off voltage is set to a voltage lower than the threshold voltage of the transistor. The transistor is turned on in response to the gate-on voltage, and is turned off in response to the gate-off voltage. In the case of the n-channel transistor, the gate-on voltage may be a gate high voltage VGH and the gate-off voltage may be a gate low voltage VGL. In the case of the p-channel transistor, the gate-on voltage may be the gate low voltage VGL, and the gate-off voltage may be the gate high voltage VGH.

The driving element of the pixel circuit may be implemented as a transistor. In the driving element, although electrical characteristics of all pixels should be uniform, there may be differences between the pixels due to process variations and element characteristic variations and the electrical characteristics may change according to the lapse of display driving time. In order to compensate for the electrical characteristic variations of the driving element, the display device may include an internal compensation circuit and an external compensation circuit. The internal compensation circuit is added to the pixel circuit in each of the sub-pixels to sample a threshold voltage Vth and/or mobility u of the driving element which changes according to the electrical characteristic of the driving element, and compensate for a change in real time. The external compensation circuit transmits a threshold voltage and/or mobility of the driving element sensed through a sensing line connected to each of the sub-pixels to an external compensation unit. The compensation unit of the external compensation circuit compensates for a change in the electrical characteristic of the driving element by reflecting the sensing result and modulating the pixel data of the input image. The external compensation circuit senses the voltage of the pixel which changes according to the electrical characteristic of the driving element, and compensates for the electrical characteristic variations of the driving elements between the pixels by modulating the data of the input image in an external circuit based on the sensed voltage.

Figure 3:
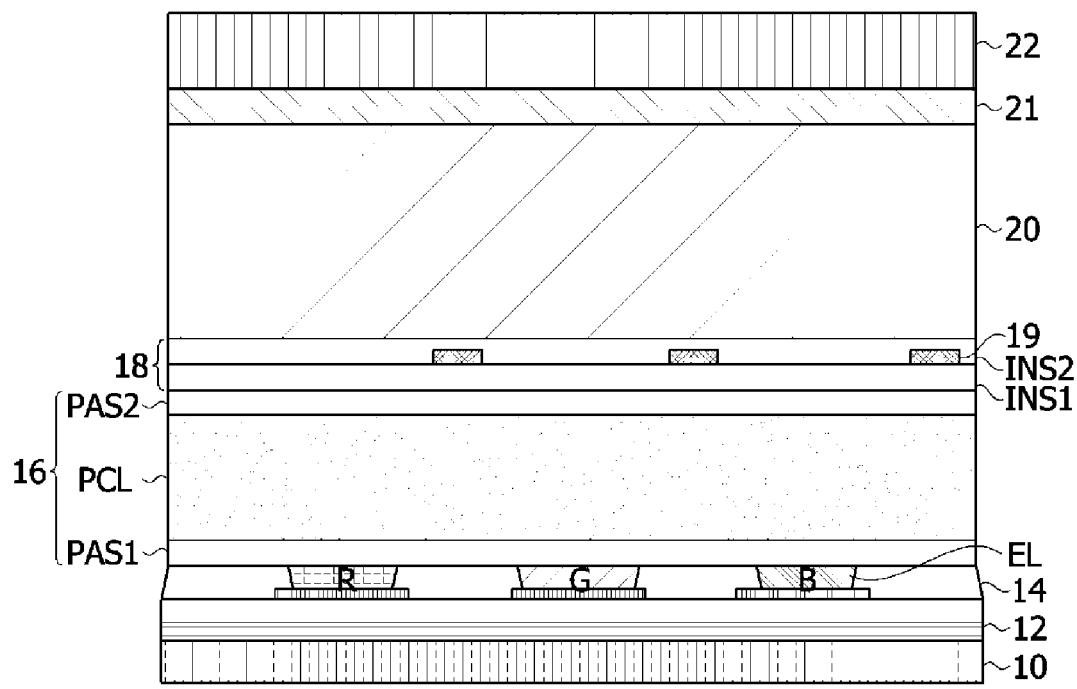
FIGS. 3 and 4 are cross-sectional views illustrating various cross-sectional structures of a display panel according to the present disclosure.
Figure 4:
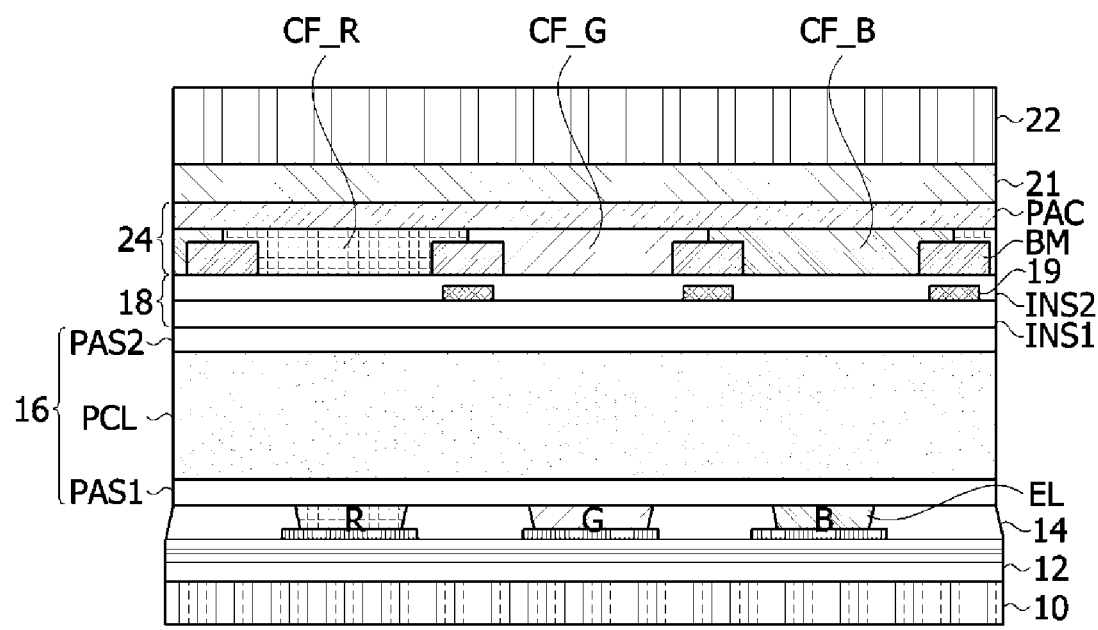

FIGS. 3 and 4 are cross-sectional views illustrating various cross-sectional structures of the display panel according to the present disclosure.

Referring to FIG. 3, the display panel 100 may include a circuit layer 12, a light emitting element layer 14, an encapsulation layer 16, and a touch sensor layer 18 which are stacked on a substrate 10.

The circuit layer 12 may include a pixel circuit connected to lines such as data lines, gate lines, and power lines, and the like, a gate driver (GIP) connected to the gate lines, and the like. The lines and the circuit elements of the circuit layer 12 may include a plurality of insulating layers, two or more metal layers separated from each other with the insulating layer therebetween, and an active layer including a semiconductor material.

The light emitting element layer 14 may include light emitting elements EL driven by the pixel circuit. The light emitting elements EL may include a red light emitting element R, a green light emitting element G, and a blue light emitting element B. In another aspect, the light emitting element layer 14 may include a white light emitting element and a color filter. The light emitting elements EL of the light emitting element layer 14 may be covered by a protective layer including an organic layer and a protective film.

The encapsulation layer 16 covers the light emitting element layer 14 to seal the circuit layer 12 and the light emitting element layer 14. The encapsulation layer 16 may have a multi-insulating film structure in which organic films and inorganic films are alternately stacked. The inorganic film blocks permeation of moisture and oxygen. The organic film planarizes a surface of the inorganic film. When the organic films and the inorganic films are stacked in multiple layers, since a movement path of the moisture or oxygen becomes longer than that of a single layer, the permeation of the moisture and oxygen, which affect the light emitting element layer 14, may be effectively blocked.

In the encapsulation layer 16, an inorganic film PAS1, an organic film PCL, and an inorganic film PAS2 may be stacked. The touch sensor layer 18 may be disposed on the inorganic films PAS2 of the encapsulation layer 16.

The touch sensor layer 18 may include capacitive type touch sensors which sense a touch input based on a change in capacitance before and after the touch input. The touch sensor layer 18 includes metal line patterns 19 forming capacitances of the touch sensors TS and insulating films INS1 and INS2. The capacitances of the touch sensors TS may be formed between the metal line patterns 19. The insulating films INS1 and INS2 may insulate intersecting portions of the metal line patterns 19 and may planarize the surface of the touch sensor layer 18.

A polarization plate 20 may be disposed on the touch sensor layer 18. The polarization plate 20 may improve visibility and a contrast ratio by converting the polarization of external light reflected by metal of the touch sensor layer 18 and the circuit layer 12. The polarization plate 20 may be implemented as a polarization plate in which a linear polarization plate and a phase retardation film are bonded or a circular polarization plate. A cover glass 22 may be adhered to the polarization plate 20. The cover glass 22 may be adhered by an adhesive 21. The adhesive 21 is an adhesive for adhering the cover glass 22, and may be an optically transparent adhesive (OCA).

In the display panel 100 shown in FIG. 4, the polarization plate 20 is removed and a color filter layer 24 is added to replace the polarization plate 20.

Referring to FIG. 4, the display panel 100 may further include the touch sensor layer 18 formed on the encapsulation layer 16, and the color filter layer 24 formed on the touch sensor layer 18.

The color filter layer 24 may include a red color filter, a green color filter, and a blue color filter CF_R, CF_G, and CF_B. Further, the color filter layer 24 may further include a black matrix pattern BM. The color filter layer 24 may absorb a portion of a wavelength of light reflected from the circuit layer 12 and the touch sensor layer 18 to serve as the polarization plate and increase color purity. In this aspect, the light transmittance of the display panel 100 may be improved and the thickness and flexibility of the display panel 100 may be improved by applying the color filter layer 24 having a higher light transmittance than the polarization plate to the display panel. The cover glass 22 may be adhered to the color filter layer 24 by the adhesive 21.

Figure 5A:
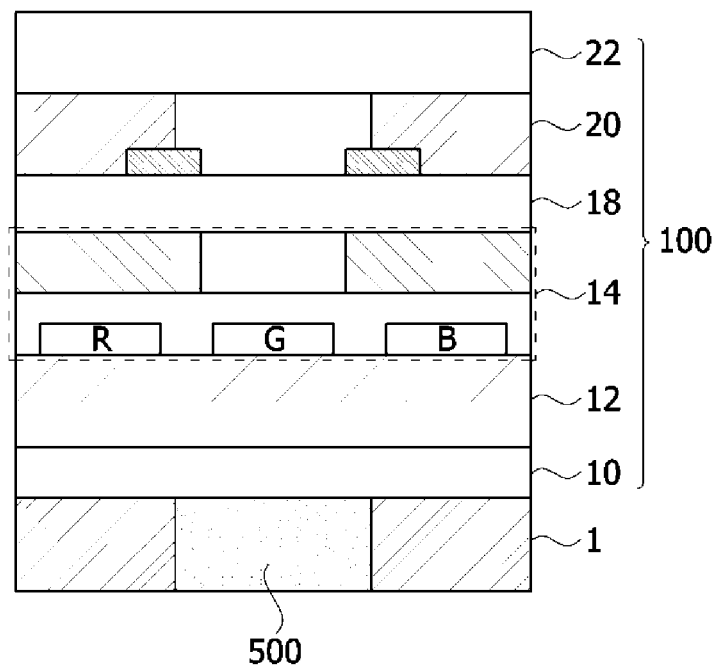
FIGS. 5A and 5B are views illustrating a schematic configuration of the display device according to the present disclosure.
Figure 5B:
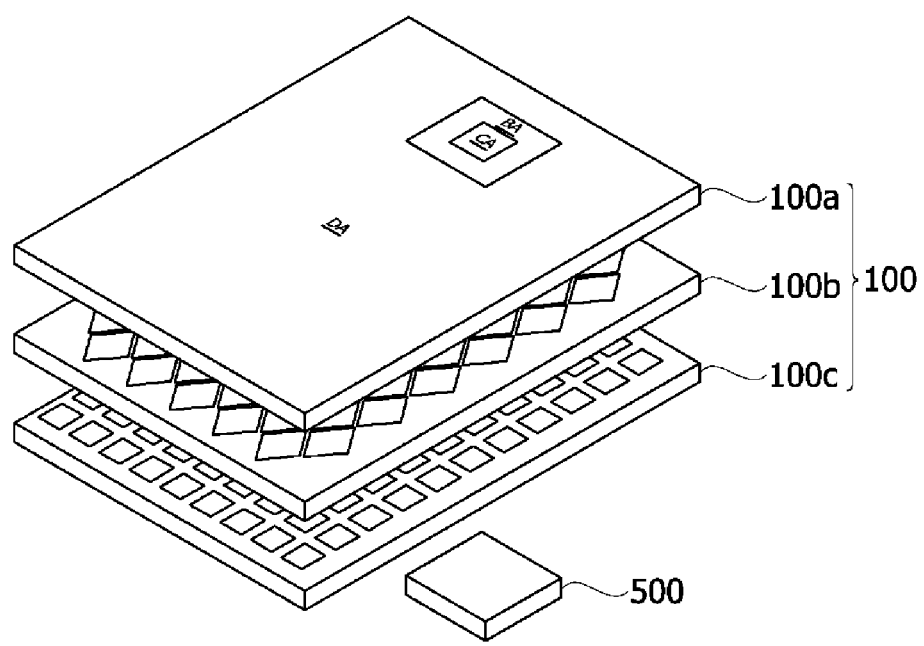

FIGS. 5A and 5B are views illustrating a schematic configuration of the display device according to the present disclosure.

Referring to FIGS. 5A and 5B, the display device according to the aspect may include a display panel 100 including a cover substrate 100a, a touch sensor unit 100b, and a pixel unit 100c, and an optical sensor unit 500.

The cover substrate 100a may be disposed at the top of the display panel 100, and may protect the display panel 100.

The pixel unit 100c may include a plurality of pixels arranged in a column direction and a row direction. Each of the plurality of pixels may include a circuit layer 12 and a light emitting element layer 14. The pixel unit 100c may be divided into a plurality of pixel regions DA, BA, and CA having different resolutions (or PPI) according to a position of the optical sensor unit 500.

The touch sensor unit 100b may sense a user's touch position. The touch sensor unit 100b may include a plurality of touch sensors. In the aspect, the touch sensor unit 100b is divided into a plurality of touch sensor regions TA1 and TA2 according to a position of the sensor unit, and the touch sensors are disposed with different electrode densities according to the plurality of touch sensor regions TA1 and TA2.

The optical sensor unit 500 may include a plurality of optical sensors, may be disposed on a back surface of the display panel 100, and may be surrounded by a foam pad 1. That is, in the sensing region, the plurality of optical sensors may be disposed on the back surface of the display panel in a state in which the foam pad 1 is punched. Here, the plurality of optical sensors may be divided into, for example, a first optical sensor including a camera, an infrared (IR) camera, and the like, and a second optical sensor including a proximity sensor, an illuminance sensor, a biometric authentication sensor (face recognition sensor), and the like.

In the aspect, the display regions and the sensing regions are divided, and the sensing regions are divided into a first sensing region CA and a second sensing region BA to differently design a resolution for each region.

Figure 6A:
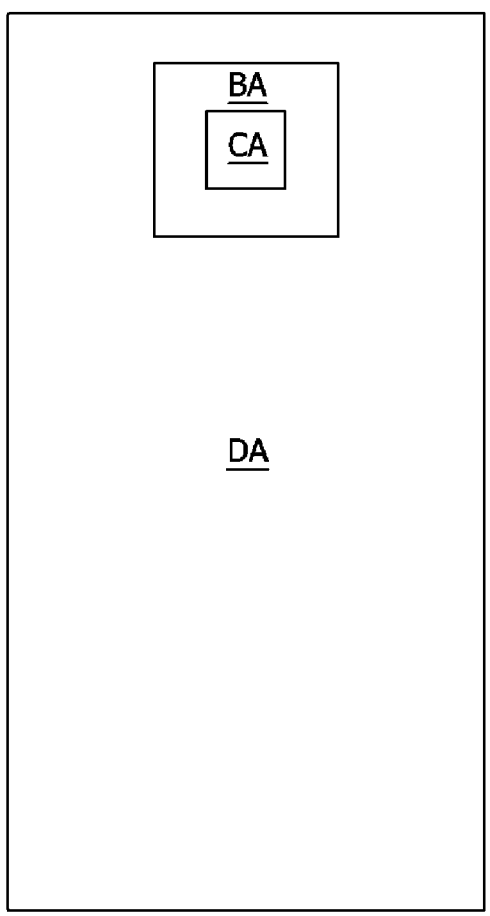
FIGS. 6A to 6B are views illustrating a screen including a display region and a sensing region according to the present disclosure.
Figure 6B:
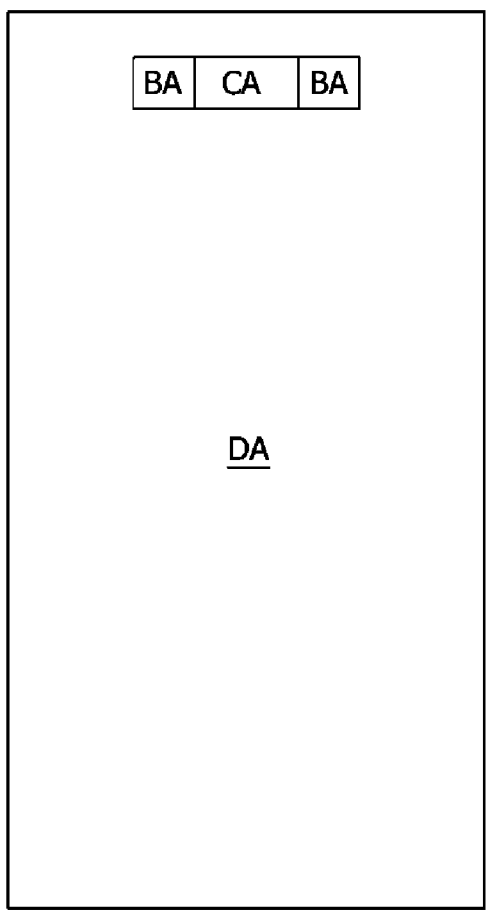

FIGS. 6A to 6B are views illustrating a screen including the display region and the sensing region according to the present disclosure.

Referring to FIG. 6A, the pixel unit of the display panel 100 according to the aspect may include the plurality of pixel regions, and the plurality of pixel regions may be divided into a first pixel region, a second pixel region, and a third pixel region. That is, the first pixel region and the second pixel region may be regions where the pixels corresponding to the first sensing region CA and the second sensing region BA are disposed, and the third pixel region may be a region where the pixels corresponding to the display region DA are disposed. In this case, the pixels may be disposed with different PPIs in the first pixel region, the second pixel region, and the third pixel region.

The first pixel region CA and the second pixel region BA may be regions where the sensors are disposed. The first pixel region CA may be a region where the first optical sensor which requires high transmittance, for example, the camera, is disposed, and the second pixel region BA may be a region where the second optical sensor which requires relatively low transmittance, for example, the proximity sensor, the illuminance sensor, or the biometric authentication sensor is disposed.

Referring to FIG. 6B, the first pixel region CA and the second pixel region BA according to the aspect may each be formed in a bar shape, but are not necessarily limited thereto, and may be formed in various shapes.

Figure 7A:
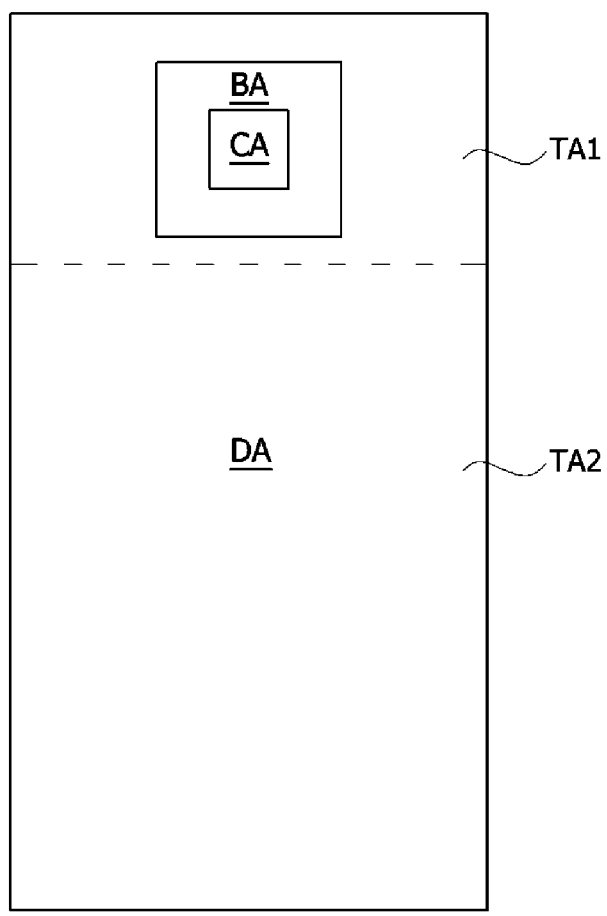
Figure 7B:
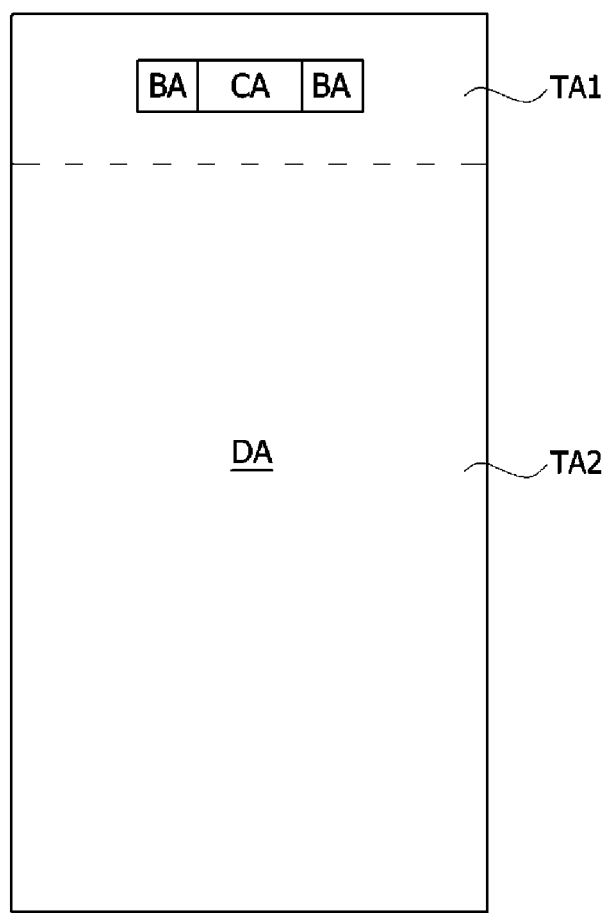
Figure 7C:
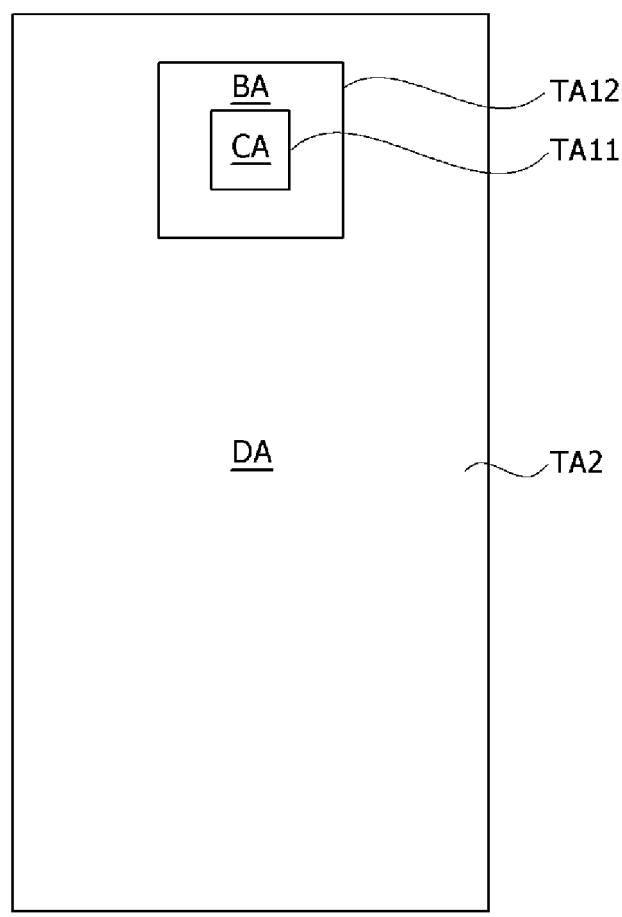
Figure 7C:
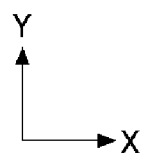
Figure 8:
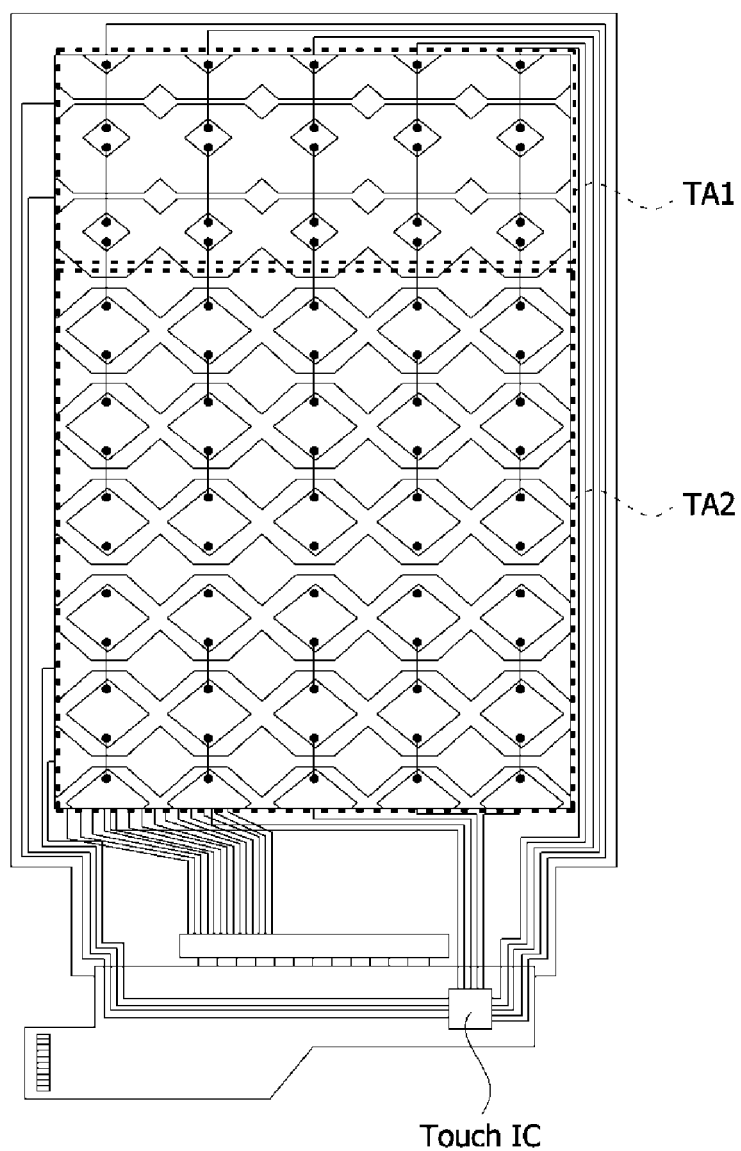
FIG. 8 is a view illustrating an example in which an electrode density of the touch sensor is differently realized.
Figure 9:
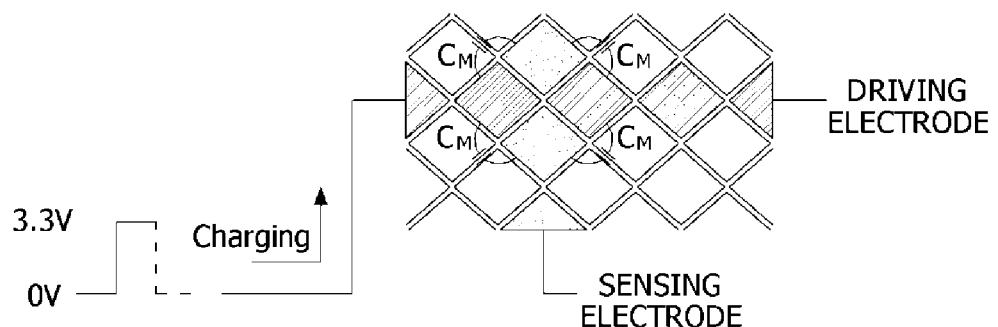
FIG. 9 are views for describing a sensing principle of the touch sensor in FIG. 8.
Figure 9:
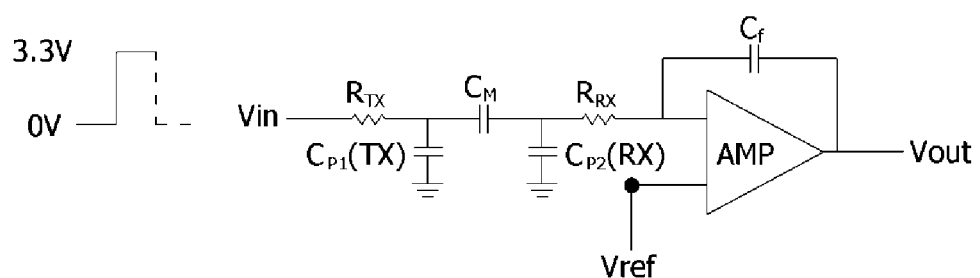

FIGS. 7A to 7D are views illustrating a touch sensor electrode density in the touch sensor region according to the present disclosure, and FIG. 8 is a view illustrating an example in which an electrode density of the touch sensor is differently realized, FIG. 9 are views for describing a sensing principle of the touch sensor in FIG. 8.

Referring to FIGS. 7A and 7B, the touch sensor unit of the display panel 100 according to an aspect of the present disclosure may be divided into a plurality of touch sensor regions, and may be divided into a first touch sensor region TA1 and a second touch sensor region TA2. The first touch sensor region TA1 may be a region where an optical sensor is disposed, and the second touch sensor region TA2 may be a region where an optical sensor is not disposed.

The first touch sensor region TA1 may minimize a region covered by metal, that is, may minimize the sizes and densities of a touch Tx electrode and a touch Rx electrode by varying the electrode density of the touch sensor.

The first touch sensor region TA1 may be designed to have the same touch sensor pattern from a left panel end to a right panel end of the sensing region. A high electrode density of the touch sensor is formed in the second touch sensor region TA2.

The second touch sensor region TA2 may be formed in a form of maintaining the electrode density of the touch sensor, that is, a form in which an entire touch region maintains the same electrode size and density to maintain touch performance. In the case of a mutual-type touch method, when a voltage is applied to the driving electrode, a charge transmitted by a mutual capacitor in a direction toward the sensing electrode is amplified to detect a charge change amount according to the presence of a touch.

Referring to FIGS. 7C and 7D, a touch sensor unit of a display panel 100 according to another aspect of the present disclosure may be divided into a plurality of touch sensor regions, and may be divided into a first-1 touch sensor region TA11, a first-2 touch sensor region TA12, and a second touch sensor region TA2. The first-1 touch sensor region TA11 may be a region where a first optical sensor is disposed, the first-2 touch sensor region TA12 may be a region where a second optical sensor is disposed, and the second touch sensor region TA2 may be a region where an optical sensor is not disposed.

That is, the first-1 touch sensor region TA11 corresponds to the first pixel region CA, the first-2 touch sensor region TA12 corresponds to the second pixel region BA, and the second touch sensor region TA2 corresponds to the third pixel region DA.

The first-1 touch sensor region TA11, the first-2 touch sensor region TA12, and the second touch sensor region TA2 may be designed to have different electrode densities of the touch sensors. For example, in the aspect, the electrode densities are designed in the order of the second touch sensor region TA2>the first-2 touch sensor region TA12>the first-1 touch sensor region TA11 and are each designed in a structure having different electrode densities.

Referring to FIG. 8, the touch sensor unit is divided into the first touch sensor region TA1 and the second touch sensor region TA2, and the electrode density of the touch sensor disposed in each of the first touch sensor region TA1 and the second touch sensor region TA2 is differently realized.

Here, the electrode density refers to a density according to an electrode size of the touch sensor. In other words, the electrode density may be determined by an area occupied by an electrode in a predetermined area. The electrode density of the first touch sensor region TA1 is lower than that of the second touch sensor region TA2. Accordingly, the electrode size of the touch sensor disposed in the first touch sensor region TA1 is smaller than that of the touch sensor disposed in the second touch sensor region TA2.

That is, the transmittance required by the optical sensors may be inversely proportional to the electrode density of the touch sensors.

Referring to FIG. 9, in the case of a mutual-type touch method, when a driving voltage is applied to the driving electrode, a charge transmitted by a mutual capacitor CM in a direction toward a sensing electrode is amplified through an amplifier AMP to sense a charge change amount according to the presence of a touch.

After a capacitor CP2 is charged with a charge by a reference voltage Vref, since the influence of the capacitor CP2 disappears during charge sensing, and a gain of the amplifier AMP becomes CM/Cf, the output voltage is the same as Equation 1 to be described below.

$$V_{out} = \frac{C_M}{C_f} V_{in} \qquad \text{[Equation 1]}$$

Here, CM is a mutual capacitor, and Cf is a feedback capacitor of the amplifier AMP.

According to Equation 1, it can be seen that the sensitivity of the touch sensor is determined by ΔCM.

However, in order to minimize light scattering and transmittance reduction, in the first touch sensor region TA1, since an electrode density of the touch sensors is low and thus touch performance may not be secured only by a change amount of touch raw data according to the presence of the touch, in the aspect, a driving algorithm capable of securing accurate touch performance even when the electrode density of the touch sensors is changed is proposed.

Figure 10:
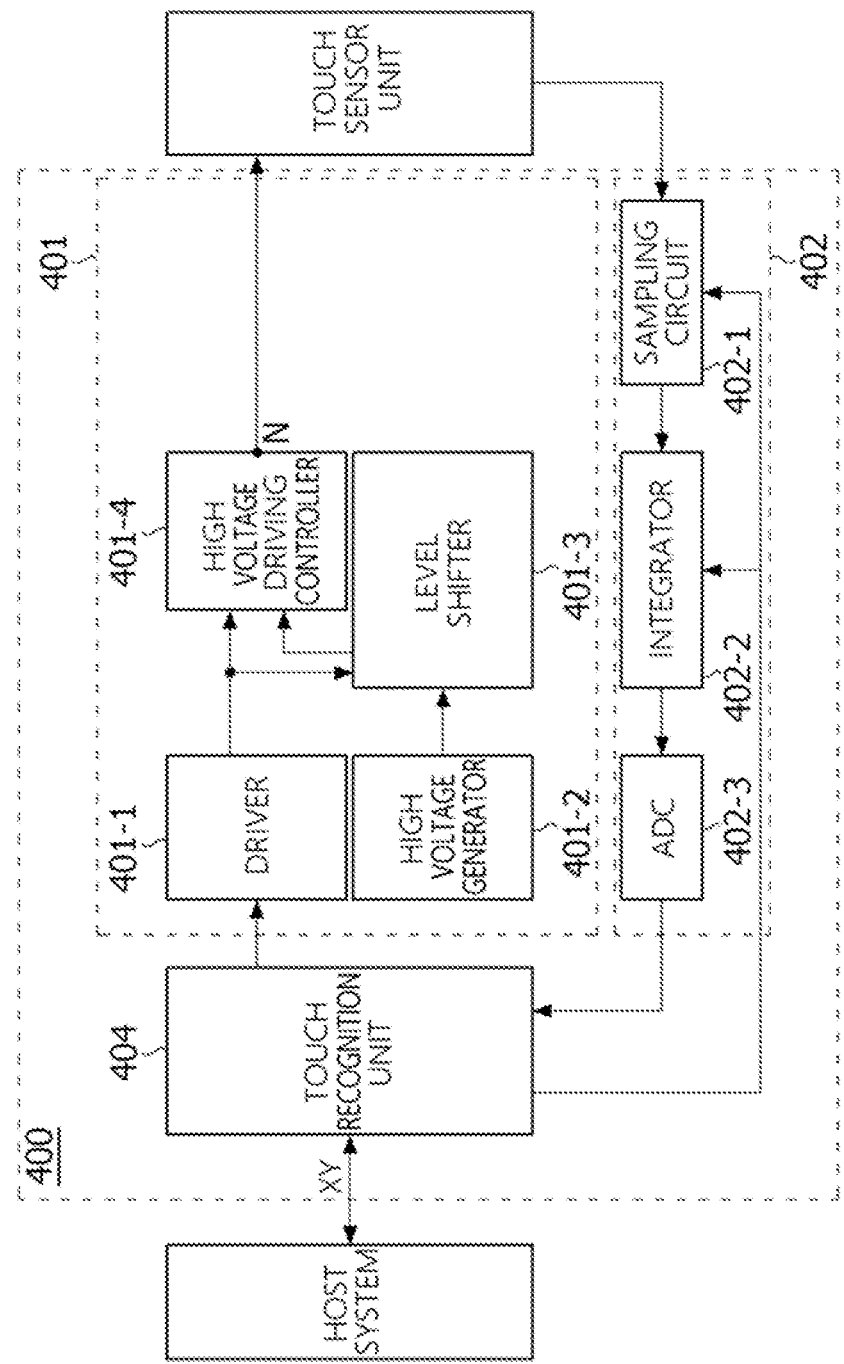
FIG. 10 is a view illustrating a touch sensor driver according to a first aspect of the present disclosure.
Figure 11:
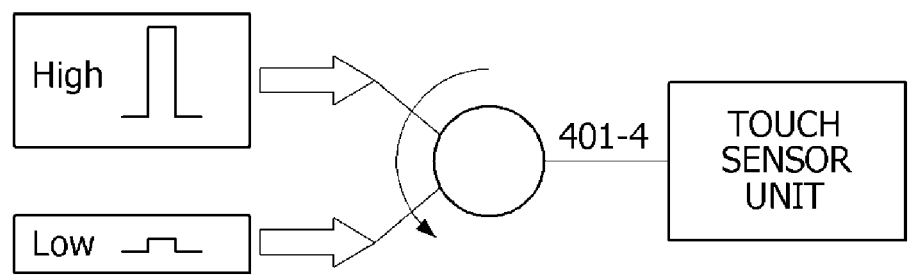
FIG. 11 is a view for describing an operation principle of a high voltage driving controller shown in FIG. 10.

FIG. 10 is a view illustrating a touch sensor driver according to a first aspect of the present disclosure, and FIG. 11 is a view for describing an operation principle of a high voltage driving controller shown in FIG. 10.

Referring to FIG. 10, a touch sensor driver 400 according to the first aspect may include a touch driver 401, a touch sensing unit 402, and a touch recognition unit 404, wherein the touch driver 401 may include a driver 401-1, a high voltage generator 401-2, a level shifter 401-3, and a high voltage driving controller 401-4, and the touch sensing unit 402 may include a sampling circuit 402-1, an integrator 402-2, and an analog-to-digital converter (ADC) 402-3.

The driver 401-1 may generate a driving voltage or a driving pulse to be applied to the touch sensors. The driver 401-1 may generate a driving pulse having a predetermined first voltage level.

The high voltage generator 401-2 may generate a high voltage having a predetermined voltage level.

The level shifter 401-3 may generate a driving pulse of a second voltage level based on the driving pulse of the first voltage level generated from the driver 401-1 and the high voltage generated from the high voltage generator 401-2.

The high voltage driving controller 401-4 may output one of the driving pulse of the first voltage level generated from the driver 401-1 and the driving pulse of the second voltage level generated from the level shifter 401-3.

Referring to FIG. 11, the high voltage driving controller 401-4 may receive a control signal from the touch recognition unit 404 to output one of the driving pulse of the first voltage level and the driving pulse of the second voltage level.

The sampling circuit 402-1 may sense touch signals induced from the touch sensor. The sampling circuit 402-1 may sense the touch signals induced from the touch sensor at a predetermined period. The sampling circuit 402-1 may receive a control signal from the touch recognition unit 404 to sense the touch signals induced from the touch sensor at a period according to the received control signal.

The integrator 402-2 may integrate or accumulate the touch signals sensed from the sampling circuit 402-1 as many as a predetermined accumulated number to output the touch signals. The integrator 402-2 may receive the control signal from the touch recognition unit 404 and accumulate the touch signals sensed from the sampling circuit 402-1 as many as an accumulated number according to the received control signal to output the touch signals.

The ADC 402-3 may convert the touch signals output from the integrator 402-2 to digital data to output touch raw data.

The touch recognition unit 404 may generate the coordinates of a touch input based on the touch raw data output from the ADC 402-3. The touch recognition unit 404 may compare the touch raw data output from the ADC 402-3 with a preset threshold value and detect the touch raw data higher than the threshold value to generate the coordinates of the touch input based on the detected touch raw data. The touch recognition unit 404 may transmit the generated coordinates XY of the touch input to a host system.

In the aspect, simultaneous driving of multiple channels of the sensing region may be checked through the illustrated node N. That is, since a signal check for each Tx channel (line) of a touch IC from the outside is performed through the node N, it is possible to check whether sequential driving or simultaneous driving for each Tx channel of the sensing region is performed.

In the aspect, high voltage driving of the sensing region and a change in the number of accumulations (number of integrations) may be checked through the illustrated node N. That is, it is possible to check a voltage level change for each Tx channel of the touch IC from the outside, and check whether a voltage is applied to a touch electrode through a high voltage circuit (booster and L/S) around Tx channel input terminals for the sensing region compared to the display region, and the number of integrations may be checked by an input timing for each Tx channel.

In the aspect, a single touch may be checked by a power consumption difference between the sensing region and the display region.

Figure 12:
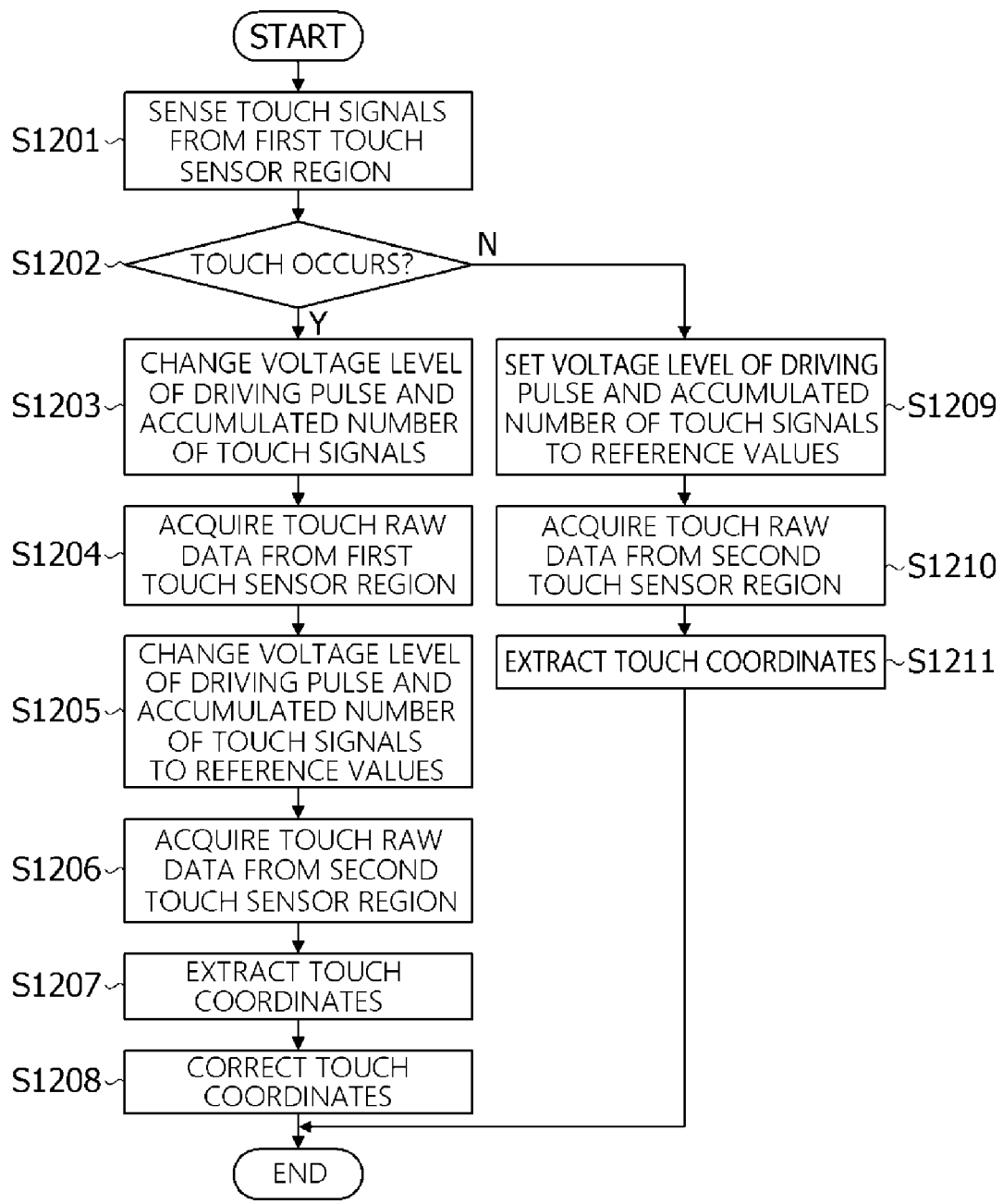
FIG. 12 is a view illustrating a driving method of a touch sensor according to the first aspect of the present disclosure.
Figure 13:
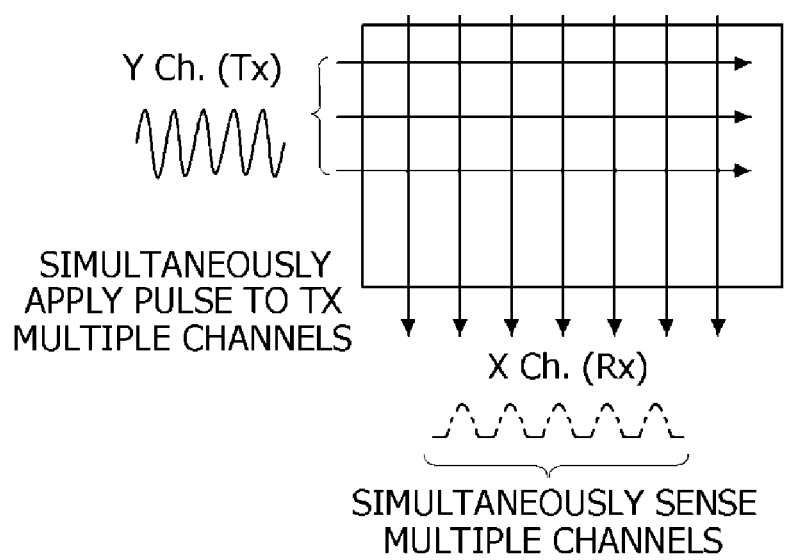
FIG. 13 is a view for describing a principle of determining whether a first touch sensor region is touched.
Figure 14:
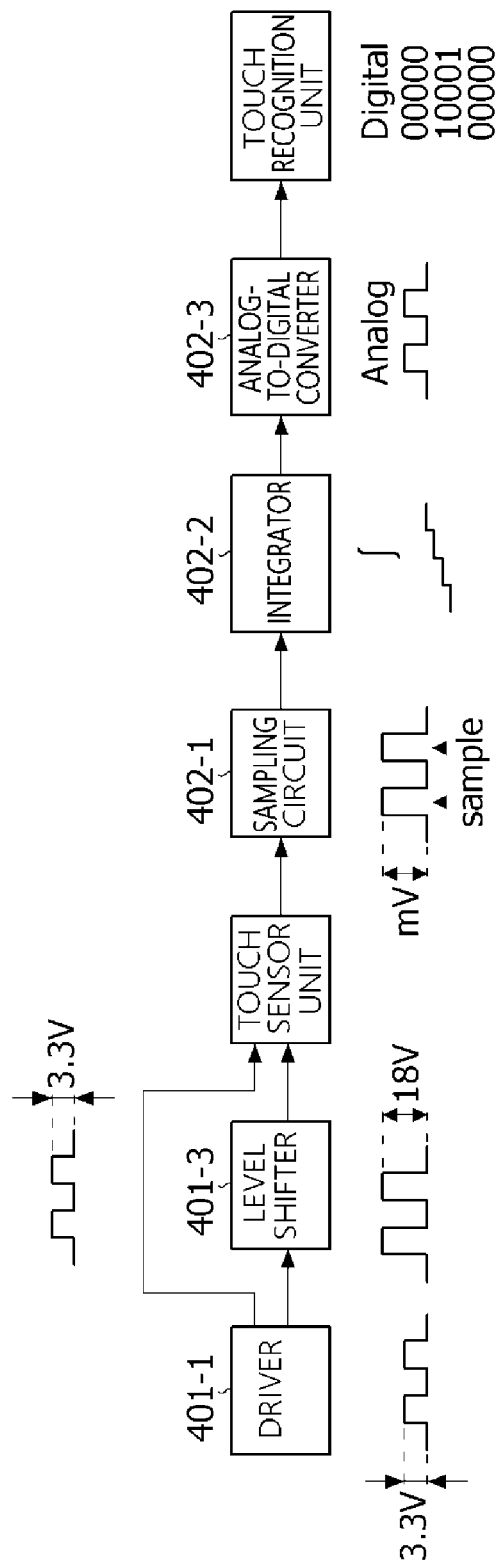
FIG. 14 is a view for describing a principle of acquiring touch raw data shown in FIG. 12.

FIG. 12 is a view illustrating a driving method of the touch sensor according to the first aspect of the present disclosure, FIG. 13 is a view for describing a principle of determining whether a first touch sensor region is touched, and FIG. 14 is a view for describing a principle of acquiring the touch raw data shown in FIG. 12.

Referring to FIG. 12, the touch sensing unit according to the first aspect of the present disclosure may sense the touch signals from the first touch sensor region (S1201), and the touch recognition unit may determine whether the first touch sensor region is touched based on the sensed touch signals (S1202).

In the aspect, the Tx channels of the first touch sensor region are grouped to be simultaneously driven, and Rx channels are grouped to be simultaneously sensed to determine whether the first touch sensor region is touched.

For example, referring to FIG. 13, the touch driver may simultaneously apply the driving pulse to a plurality of touch sensors disposed in the first touch sensor region through a plurality of Tx channels, the touch sensing unit may simultaneously sense the touch signals from the plurality of touch sensors disposed in the first touch sensor region through the Rx channels, and the touch recognition unit may determine whether the first touch sensor region is touched based on the sensed touch signals.

Next, the touch recognition unit may change a voltage level of a driving pulse applied to the first touch sensor region and an accumulated number of the touch signals sensed from the first touch sensor region when the touch on the first touch sensor region occurs (S1203).

Next, the touch sensing unit may acquire the touch raw data from the first touch sensor region (S1204).

For example, referring to FIG. 14, the touch driver sequentially applies the changed driving pulse of a second voltage level (18 V) to the touch sensors through each Tx channel of the first touch sensor region. The touch sensing unit may sequentially sample the touch signals sensed from the touch sensors through the Rx channel, and may accumulate the sampled touch signals the changed accumulated number and then convert the touch signals to digital data and generate the touch raw data, thereby outputting the touch raw data to the touch recognition unit.

Next, the touch recognition unit may change a voltage level of a driving pulse applied to the second touch sensor region and the accumulated number of touch signals sensed from the second touch sensor region to reference values (S1205).

Next, the touch sensing unit may acquire the touch raw data from the second touch sensor region (S1206).

For example, referring to FIG. 14, the touch driver sequentially applies a driving pulse of a first voltage level (3.3 V) changed to the reference value to the touch sensors through each Tx channel of the second touch sensor region. The touch sensing unit may sequentially sample the touch signals sensed from the touch sensors through the Rx channel, and may accumulate the sampled touch signals as many as an accumulated number changed to the reference value and then convert the touch signals to digital data and generate the touch raw data, thereby outputting the touch raw data to the touch recognition unit.

Next, the touch recognition unit may extract touch coordinates based on the acquired touch raw data (S1207).

Next, the touch recognition unit may correct the touch coordinates of an edge portion in a screen (S1208). The correction of the touch coordinates may be performed using a known algorithm.

On the other hand, next, the touch recognition unit may set the voltage level of the driving pulse applied to the second touch sensor region and the accumulated number of the touch signals sensed from the second touch sensor region to the reference values when the touch on the first touch sensor region does not occur (S1209).

Next, the touch sensing unit may acquire the touch raw data from the second touch sensor region (S1210).

For example, referring to FIG. 14, the touch driver sequentially applies the driving pulse of the first voltage level (3.3 V) set to the reference value to the touch sensors through each Tx channel of the second touch sensor region. The touch sensing unit may sequentially sample the touch signals sensed from the touch sensors through the Rx channel, and may accumulate the sampled touch signals an accumulated number set to the reference value and then convert the touch signals to digital data and generate the touch raw data, thereby outputting the touch raw data to the touch recognition unit.

Next, the touch recognition unit may extract the touch coordinates based on the acquired touch raw data (S1211).

Figure 15:
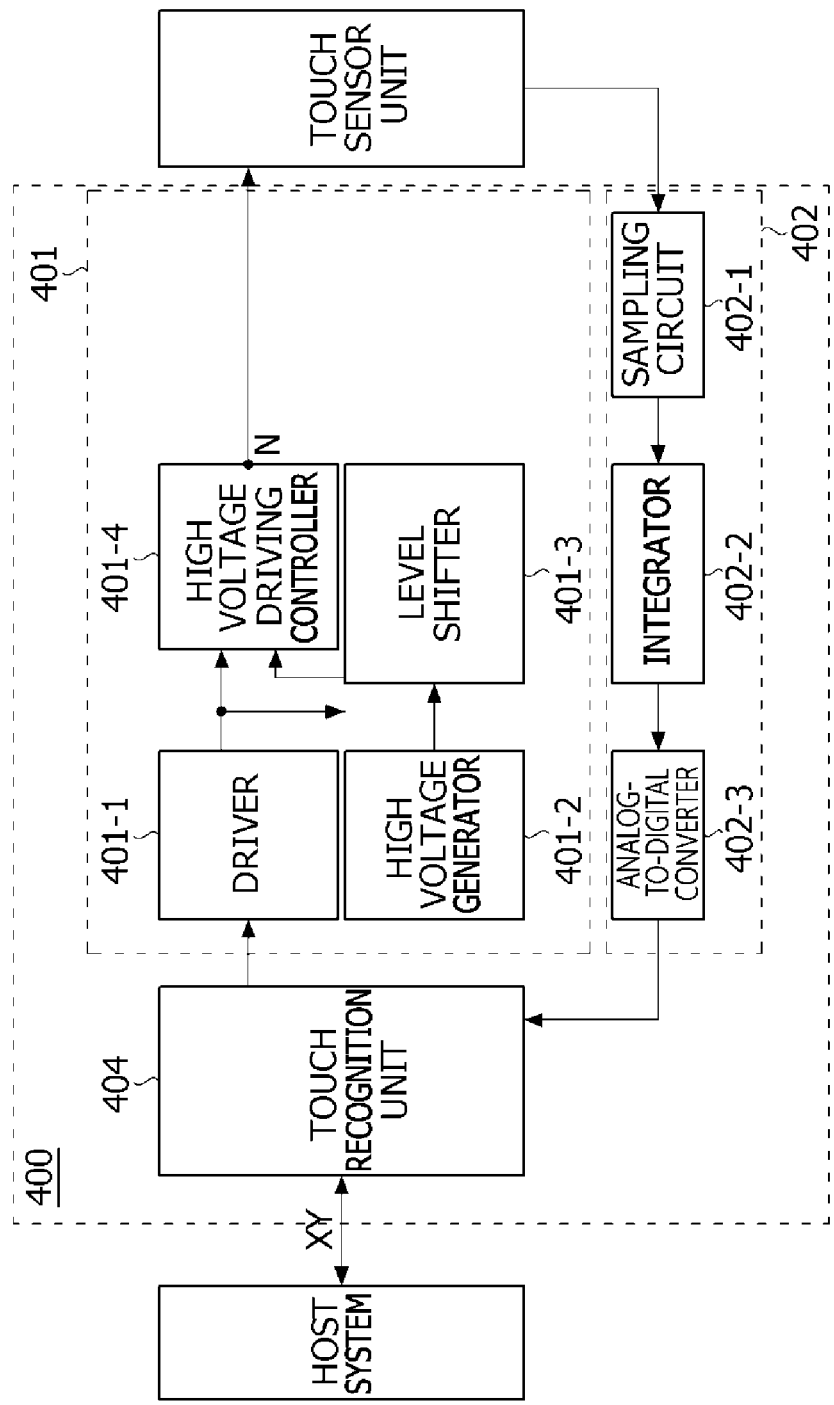
FIG. 15 is a view illustrating a touch sensor driver according to a second aspect of the present disclosure.

FIG. 15 is a view illustrating a touch sensor driver according to a second aspect of the present disclosure.

Referring to FIG. 15, a touch sensor driver 400 according to the second aspect the present disclosure may include a touch driver 401, a touch sensing unit 402, and a touch recognition unit 404, wherein the touch driver 401 may include a driver 401-1, a high voltage generator 401-2, a level shifter 401-3, and a high voltage driving controller 401-4, and the touch sensing unit 402 may include a sampling circuit 402-1, an integrator 402-2, and an ADC 402-3.

The driver 401-1 may generate a driving voltage or a driving pulse to be applied to the touch sensors. The driver 401-1 may generate a driving pulse having a predetermined first voltage level.

The high voltage generator 401-2 may generate a high voltage having a predetermined voltage level.

The level shifter 401-3 may generate a driving pulse of a second voltage level based on the driving pulse of the first voltage level generated from the driver 401-1 and the high voltage generated from the high voltage generator 401-2.

The high voltage driving controller 401-4 may output one of the driving pulse of the first voltage level generated from the driver 401-1 and the driving pulse of the second voltage level generated from the level shifter 401-3.

The sampling circuit 402-1 may sense touch signals induced from the touch sensor. The sampling circuit 402-1 may sense the touch signals induced from the touch sensor at a predetermined period.

The integrator 402-2 may integrate or accumulate the touch signals sensed from the sampling circuit 402-1 as many as a predetermined accumulated number to output the touch signals.

The ADC 402-3 may convert the touch signals output from the integrator 402-2 to digital data to output touch raw data.

The touch recognition unit 404 may generate the coordinates of a touch input based on the touch raw data output from the ADC 402-3. The touch recognition unit 404 may compare the touch raw data output from the ADC 402-3 with a preset threshold value and detect the touch raw data higher than the threshold value to generate the coordinates of the touch input based on the detected touch raw data. The touch recognition unit 404 may transmit the generated coordinates XY of the touch input to a host system.

Figure 16:
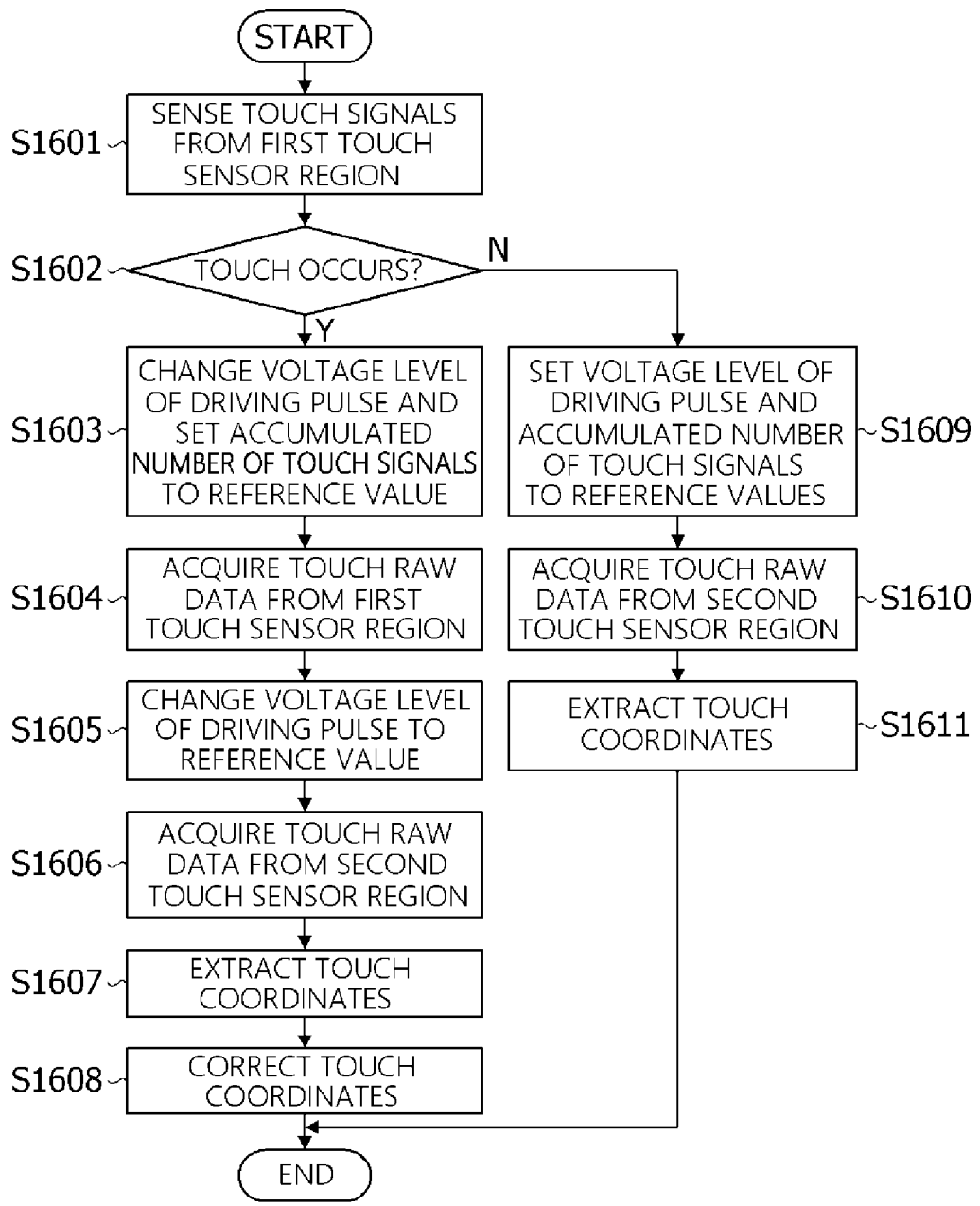
FIG. 16 is a view illustrating a driving method of a touch sensor according to the second aspect of the present disclosure.

FIG. 16 is a view illustrating a driving method of a touch sensor according to the second aspect of the present disclosure.

Referring to FIG. 16, the touch sensing unit according to the second aspect of the present disclosure may sense touch signals from a first touch sensor region (S1601), and the touch recognition unit may determine whether the first touch sensor region is touched based on the sensed touch signals (S1602).

Next, the touch recognition unit may change a voltage level of a driving pulse applied to the first touch sensor region and set an accumulated number of the touch signals sensed from the first touch sensor region to a reference value when the touch on the first touch sensor region occurs (S1603).

Next, the touch sensing unit may acquire the touch raw data from the first touch sensor region (S1604).

Next, the touch recognition unit may change a voltage level of a driving pulse applied to the second touch sensor region to the reference value (S1605).

Next, the touch sensing unit may acquire the touch raw data from the second touch sensor region (S1606).

Next, the touch recognition unit may extract touch coordinates based on the acquired touch raw data (S1607).

Next, the touch recognition unit may correct the touch coordinates of an edge portion in a screen (S1608). The touch coordinates may generally be corrected using a widely known algorithm.

On the other hand, next, the touch recognition unit may set the voltage level of the driving pulse applied to the second touch sensor region and the accumulated number of the touch signals sensed from the second touch sensor region to the reference values when the touch on the first touch sensor region does not occur (S1609).

Next, the touch sensing unit may acquire the touch raw data from the second touch sensor region (S1610).

Next, the touch recognition unit may extract the touch coordinates based on the acquired touch raw data (S1611).

Figure 17:
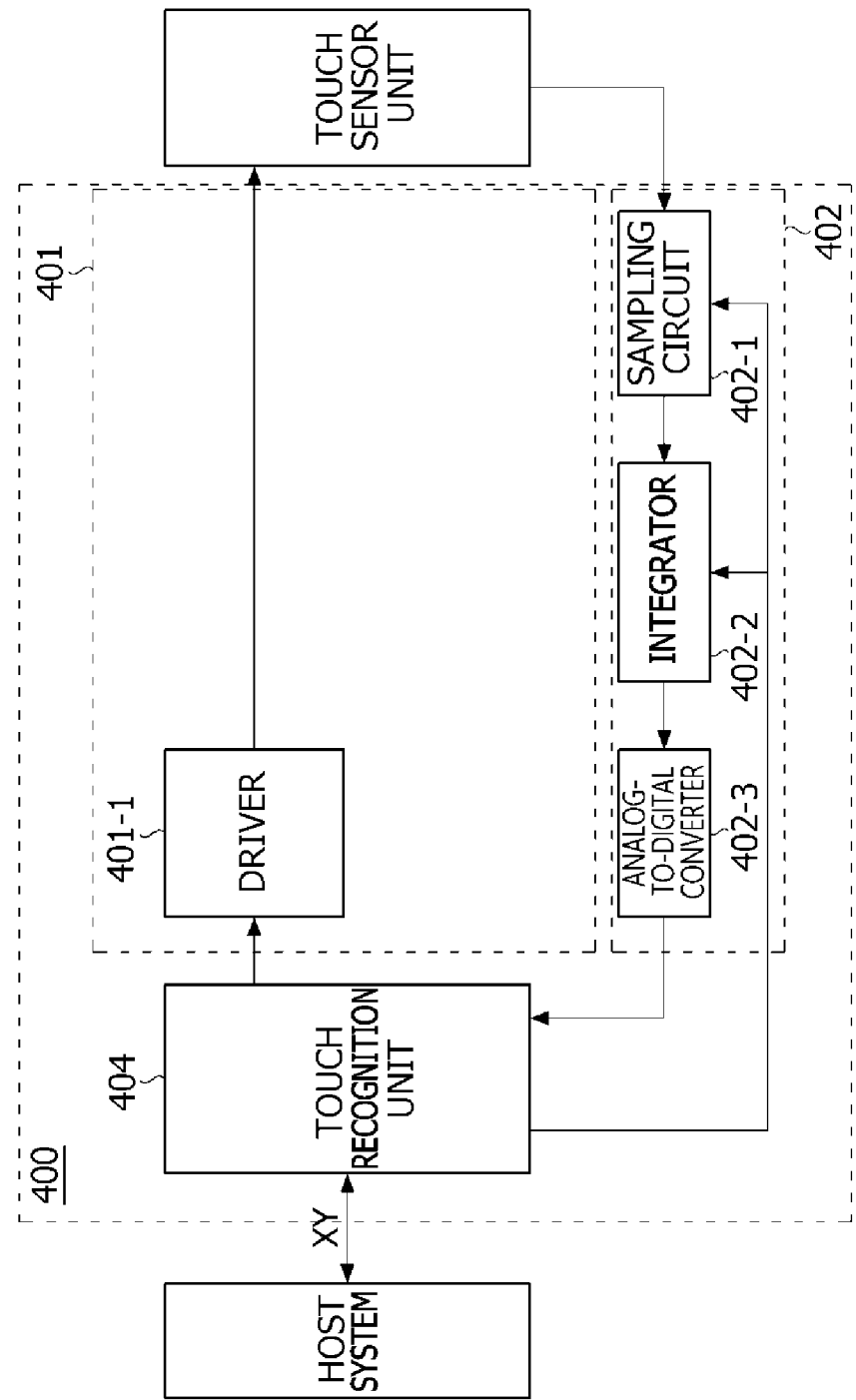
FIG. 17 is a view illustrating a touch sensor driver according to a third aspect of the present disclosure.

FIG. 17 is a view illustrating a touch sensor driver according to a third aspect of the present disclosure.

Referring to FIG. 17, a touch sensor driver 400 according to the third aspect the present disclosure may include a touch driver 401, a touch sensing unit 402, and a touch recognition unit 404, wherein the touch driver 401 may include a driver 401-1, and the touch sensing unit 402 may include a sampling circuit 402-1, an integrator 402-2, and an ADC 402-3.

The driver 401-1 may generate a driving voltage or a driving pulse to be applied to the touch sensors. The driver 401-1 may generate a driving pulse having a predetermined first voltage level.

The sampling circuit 402-1 may sense touch signals induced from the touch sensor. The sampling circuit 402-1 may sense the touch signals induced from the touch sensor at a predetermined period.

The integrator 402-2 may integrate or accumulate the touch signals sensed from the sampling circuit 402-1 as many as a predetermined accumulated number to output the touch signals.

The ADC 402-3 may convert the touch signals output from the integrator 402-2 to digital data to output touch raw data.

The touch recognition unit 404 may generate the coordinates of a touch input based on the touch raw data output from the ADC 402-3. The touch recognition unit 404 may compare the touch raw data output from the ADC 402-3 with a preset threshold value and detect the touch raw data higher than the threshold value to generate the coordinates of the touch input based on the detected touch raw data. The touch recognition unit 404 may transmit the generated coordinates XY of the touch input to a host system.

Figure 18:
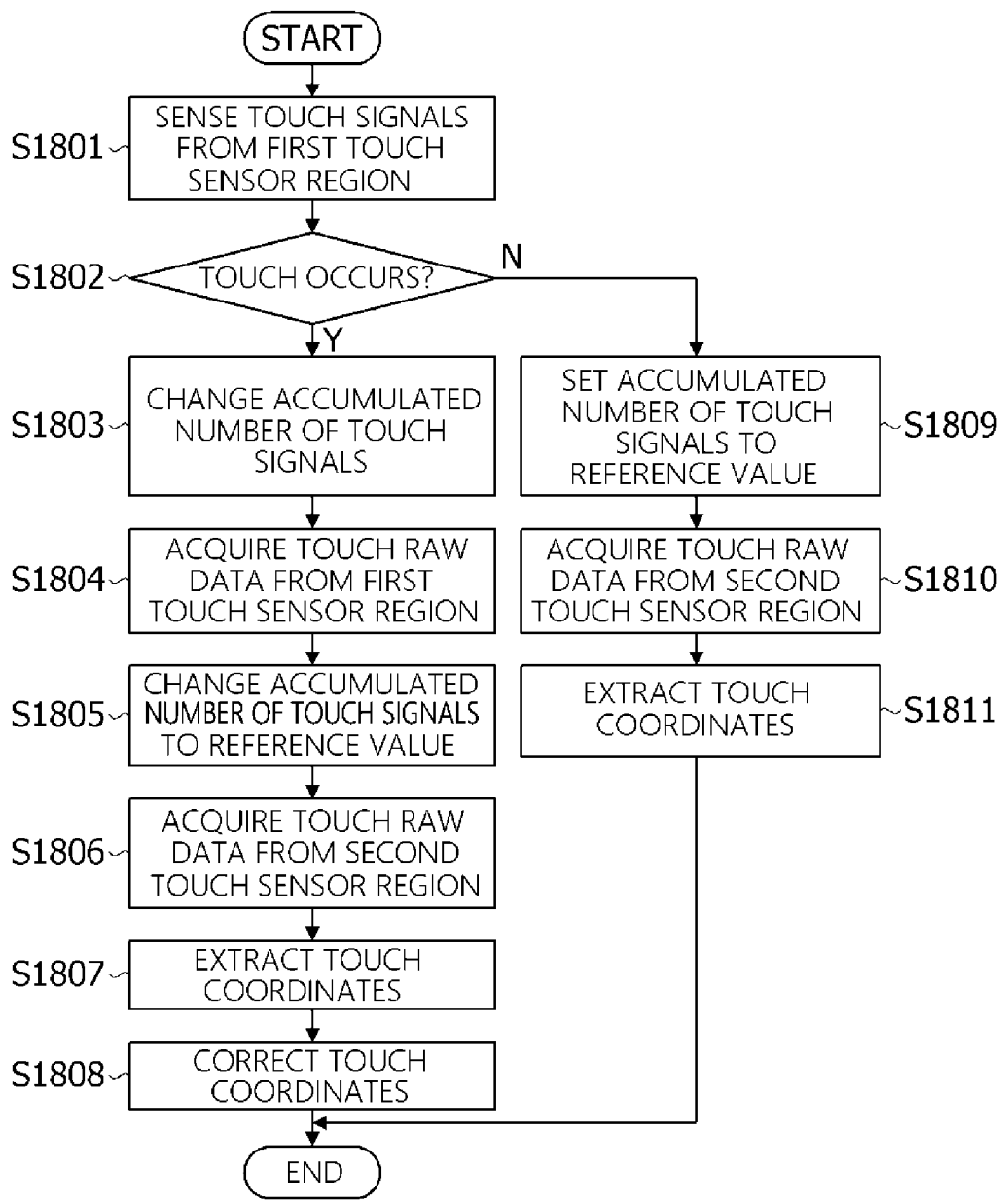
FIG. 18 is a view illustrating a driving method of a touch sensor according to the third aspect of the present disclosure.

FIG. 18 is a view illustrating a driving method of a touch sensor according to the third aspect of the present disclosure.

Referring to FIG. 18, the touch sensing unit according to the third aspect of the present disclosure may sense the touch signals from the first touch sensor region (S1801), and the touch recognition unit may determine whether the first touch sensor region is touched based on the sensed touch signals (S1802).

Next, the touch recognition unit may set a voltage level of a driving pulse applied to the first touch sensor region to a reference value and change an accumulated number of the touch signals sensed from the first touch sensor region when the touch on the first touch sensor region occurs (S1803).

Next, the touch sensing unit may acquire the touch raw data from the first touch sensor region (S1804).

Next, the touch recognition unit may change the accumulated number of the touch signals sensed from the second touch sensor region to the reference value (S1805).

Next, the touch sensing unit may acquire the touch raw data from the second touch sensor region (S1806).

Next, the touch recognition unit may extract touch coordinates based on the acquired touch raw data (S1807).

Next, the touch recognition unit may correct the touch coordinates of an edge portion in a screen (S1808). The touch coordinates may generally be corrected using a widely known algorithm.

On the other hand, next, the touch recognition unit may set the voltage level of the driving pulse applied to the second touch sensor region and the accumulated number of the touch signals sensed from the second touch sensor region to the reference values when the touch on the first touch sensor region does not occur (S1809).

Next, the touch sensing unit may acquire the touch raw data from the second touch sensor region (S1810).

Next, the touch recognition unit may extract the touch coordinates based on the acquired touch raw data (S1811).

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Therefore, it should be understood that the above-described aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
   a pixel unit including a sensing region where first pixels are disposed at a first PPI (pixels per inch) and a display region where second pixels are disposed at a second PPI higher than the first PPI;
   a touch sensor unit disposed on the pixel unit and including a first touch sensor region where touch sensors are disposed at a first electrode density and a second touch sensor region where touch sensors are disposed at a second electrode density higher than the first electrode density;
   a display panel driver configured to drive the pixel unit; and
   a touch sensor driver configured to:
   sense a touch signal from the first touch sensor region overlapping the sensing region of the first touch sensor region and the second touch sensor region, and
   change at least one of a voltage level of a driving pulse applied to the first touch sensor region and an accumulated number of touch signals sensed from the first touch sensor region based on the touch signals sensed from the first touch sensor region when a touch on the first touch sensor region overlapping the sensing region occurs,
   wherein the first touch sensor region overlaps the sensing region, and the second touch sensor region does not overlap the sensing region,
   wherein at least one optical sensor is disposed in the sensing region, and
   wherein the voltage level of a driving pulse applied to the first touch sensor region and the accumulated number of touch signals sensed from the first touch sensor region is not changed when the touch on the first touch sensor region does not occur.

2. The display device of claim 1, wherein an electrode of the touch sensor disposed at the first electrode density has a smaller size than an electrode of the touch sensor disposed at the second electrode density.

3. The display device of claim 2, wherein the touch sensor driver determines whether the first touch sensor region is touched based on the touch signals sensed from the first touch sensor region, and changes at least one of the voltage level of the driving pulse applied to the first touch sensor region and the accumulated number of the touch signals sensed from the first touch sensor region when a touch on the first touch sensor region occurs according to the determination result.

4. The display device of claim 3, wherein the touch sensor driver simultaneously applies the driving pulse to the plurality of touch sensors disposed in the first touch sensor region, and determines whether the first touch sensor region is touched based on the touch signals simultaneously sensed from the plurality of touch sensors disposed in the first touch sensor region.

5. The display device of claim 3, wherein the touch sensor driver includes:
   a touch recognition unit configured to determine whether the first touch sensor region is touched, and generate at least one of a first control signal for changing the voltage level of the driving pulse and a second control signal for changing the accumulated number of the touch signals according to the determination result;
   a touch driver configured to apply a driving pulse of a predetermined voltage level to the touch sensors according to the first control signal; and
   a touch sensing unit configured to accumulate the touch signals sensed from the touch sensors as many as a predetermined accumulated number according to the second control signal to output a touch raw signal.

6. The display device of claim 5, wherein the touch driver includes:
   a driver configured to generate a driving pulse of a first voltage level applied to the touch sensors;
   a high voltage generator configured to generate a high voltage having a predetermined magnitude;
   a level shifter configured to increase the first voltage level of the driving pulse based on the high voltage to generate a driving pulse of a second voltage level; and
   a switch configured to apply any one of the driving pulse of the first voltage level and the driving pulse of the second voltage level to the touch sensors according to the first control signal.

7. The display device of claim 5, wherein the touch sensing unit includes:
   a sampling circuit configured to sense the touch signals from the touch sensors at a predetermined period according to the second control signal;
   an integrator configured to accumulate the sensed touch signals as many as the predetermined accumulated number according to the second control signal and output the sensed touch signals; and
   an analog-to-digital converter configured to convert the output touch signals to digital data to output the touch raw signal.

8. The display device of claim 3, wherein the touch sensor driver includes:
   a touch recognition unit configured to determine whether the first touch sensor region is touched, and generate a control signal for changing the voltage level of the driving pulse according to the determination result;
   a touch driver configured to apply a driving pulse of a predetermined voltage level to the touch sensors according to the control signal; and
   a touch sensing unit configured to accumulate the touch signals sensed from the touch sensors as many as a predetermined accumulated number to output a touch raw signal.

9. The display device of claim 3, wherein the touch sensor driver includes:
- a touch recognition unit configured to determine whether the first touch sensor region is touched, and generate at least one of control signals for changing the accumulated number of the touch signals according to the determination result;
- a touch driver configured to apply a driving pulse of a predetermined voltage level to the touch sensors; and
- a touch sensing unit configured to accumulate the touch signals sensed from the touch sensors as many as a predetermined accumulated number according to the control signal to output a touch raw signal.

10. The display device of claim 5, wherein the touch sensor driver sets a voltage level of a driving pulse applied to the second touch sensor region and the accumulated number of the touch signals sensed from the second touch sensor region to predetermined reference values.

11. A driving method of a display device including a pixel unit including a sensing region where first pixels are disposed at a first pixels per inch (PPI) and a display region where second pixels are disposed at a second PPI higher than the first PPI, and a touch sensor unit disposed on the pixel unit, and including a first touch sensor region where touch sensors are disposed at a first electrode density and a second touch sensor region where touch sensors are disposed at a second electrode density higher than the first electrode density, the driving method comprising:
- sensing touch signals from the first touch sensor region overlapping with the sensing region of the first touch sensor region and the second touch sensor region;
- determining whether a touch on the first touch sensor region occurs based on the sensed touch signals; and
- changing at least one of a voltage level of a driving pulse applied to the first touch sensor region and an accumulated number of the touch signals sensed from the first touch sensor region according to the determination result that the touch on the first touch sensor region occurs,
- wherein the first touch sensor region overlaps the sensing region, and the second touch sensor region does not overlap the sensing region,
- wherein at least one optical sensor is disposed in the sensing region, and
- wherein the voltage level of a driving pulse applied to the first touch sensor region and the accumulated number of touch signals sensed from the first touch sensor region is not changed when the touch on the first touch sensor region does not occur.

12. The driving method of claim 11, wherein the determining whether the touch on the first touch sensor region occurs includes:
- simultaneously applying the driving pulse to the plurality of touch sensors disposed in the first touch sensor region; and
- determining whether the first touch sensor region is touched based on the touch signals simultaneously sensed from the plurality of touch sensors disposed in the first touch sensor region.

13. The driving method of claim 12, wherein the changing at least one of a voltage level of a driving pulse includes:
- generating at least one of a first control signal for changing the voltage level of the driving pulse and a second control signal for changing the accumulated number of the touch signals when the touch on the first touch sensor region occurs;
- applying a driving pulse of a predetermined voltage level to the touch sensors according to the first control signal; and
- accumulating the touch signals sensed from the touch sensors as many as a predetermined accumulated number according to the second control signal to output a touch raw signal.

14. The driving method of claim 12, wherein the changing at least one of a voltage level of a driving pulse includes:
- generating a control signal for changing the voltage level of the driving pulse when the touch on the first touch sensor region occurs;
- changing the voltage level of the driving pulse according to the control signal, and applying a driving pulse of which the voltage level is changed to the touch sensors.

15. The driving method of claim 12, wherein the changing operation includes:
- generating a control signal for changing the accumulated number of the touch signals when the touch on the first touch sensor region occurs; and
- accumulating the touch signals sensed from the touch sensors as many as a predetermined accumulated number according to the control signal to output a touch raw signal.

16. The driving method of claim 11, further comprising:
- applying the driving pulse of the changed voltage level to a plurality of first touch sensors disposed in the first touch sensor region, and accumulating the touch signals sensed from the first touch sensors as many as the changed accumulated number to output a first touch raw signal; and
- applying a driving pulse of a reference voltage level to a plurality of second touch sensors disposed in the second touch sensor region, and accumulating touch signals sensed from the second touch sensors as many as a reference accumulated number to output a second touch raw signal.

17. The driving method of claim 11, further comprising:
- applying the driving pulse of the changed voltage level to a plurality of first touch sensors disposed in the first touch sensor region, and accumulating the touch signals sensed from the first touch sensors as many as a predetermined accumulated number to output a first touch raw signal; and
- applying a driving pulse of a reference voltage level to a plurality of second touch sensors disposed in the second touch sensor region, and accumulating touch signals sensed from the second touch sensors as many as a reference accumulated number to output a second touch raw signal.

18. The driving method of claim 11, further comprising:
- applying a driving pulse of a predetermined level to a plurality of first touch sensors disposed in the first touch sensor region, and accumulating touch signals sensed from the first touch sensors as many as the changed accumulated number to output a first touch raw signal; and
- applying a driving pulse of a reference voltage level to a plurality of second touch sensors disposed in the second touch sensor region, and accumulating touch signals sensed from the second touch sensors as many as a reference accumulated number to output a second touch raw signal.

19. A display device comprising:
- a pixel unit including first pixels disposed in a sensing region and second pixels disposed in a display region having a higher pixel density than the sensing region;

a touch sensor unit disposed on the pixel unit and including a first touch sensor region and a second touch sensor region a higher electrode density higher than the first touch sensor region;

a display panel driver configured to drive the pixel unit; and a touch sensor driver configured to:

sense a touch signal from the first touch sensor region overlapping the sensing region of the first touch sensor region and the second touch sensor region, simultaneously apply the driving pulse to the first touch sensor region to determine whether a touch on the first touch sensor region occurs based on touch signals simultaneously sensed from the first touch sensor region, and change at least one of a voltage level of a driving pulse applied to the first touch sensor region and an accumulated number of the touch signals sensed from the first touch sensor region when the touch on the first touch sensor region overlapping with the sensing region occurs, wherein the first touch sensor region overlaps the sensing region and the second touch sensor region does not overlap the sensing region, wherein at least one optical sensor is disposed in the sensing region, and wherein the voltage level of a driving pulse applied to the first touch sensor region and the accumulated number of touch signals sensed from the first touch sensor region is not changed when the touch on the first touch sensor region does not occur.

20. The display device of claim 19, wherein the touch sensor driver sets a voltage level of a driving pulse applied to the second touch sensor region and an accumulated number of touch signals sensed from the second touch sensor region to predetermined reference values.

* * * * *